(12) United States Patent
Aly et al.

(10) Patent No.: US 8,903,803 B1
(45) Date of Patent: Dec. 2, 2014

(54) HORIZONTAL INTERVAL-BASED DATA PARTITIONING AND INDEXING FOR LARGE CLUSTERS

(71) Applicant: Turn Inc., Redwood City, CA (US)

(72) Inventors: Ahmed Moustafa Hussein Aly, Tippecanoe, IN (US); Hazem Elmeleegy, San Mateo, CA (US); Yan Qi, Fremont, CA (US)

(73) Assignee: Turn Inc., Redwood City, CA (US)

( * ) Notice: Subject to any disclaimer, the term of this patent is extended or adjusted under 35 U.S.C. 154(b) by 0 days.

(21) Appl. No.: 14/308,517

(22) Filed: Jun. 18, 2014

(51) Int. Cl.
*G06F 17/30* (2006.01)

(52) U.S. Cl.
CPC ....... *G06F 17/30321* (2013.01); *Y10S 707/964* (2013.01)
USPC .......................................... 707/713; 707/964

(58) Field of Classification Search
USPC .................................................. 707/713, 964
See application file for complete search history.

(56) References Cited

U.S. PATENT DOCUMENTS

| | | | |
|---|---|---|---|
| 2007/0271437 A1* | 11/2007 | Ramirez et al. | 711/173 |
| 2009/0063396 A1* | 3/2009 | Gangarapu et al. | 707/2 |
| 2014/0025658 A1* | 1/2014 | Thiyagarajan et al. | 707/713 |

OTHER PUBLICATIONS

Article entitled "Overview of Turn Data Management Platform for Digital Advertising", by Elmeleegy et al., Copyright 2013.*
Article entitled "Published COnference Papers", by Aly, last accessed on Oct. 2, 2014.*
"CGAL: Computational Geometry Algorithms Library", Retrieved from the Internet: <https://web.archive.org/web/20120622091326/https://en.wikipedia.org/wiki/Interval_tree>, Accessible Apr. 2012, 1 pg.

(Continued)

*Primary Examiner* — Mahesh Dwivedi
(74) *Attorney, Agent, or Firm* — Kwan & Olynick LLP

(57) ABSTRACT

Current data records having a start and end time are transformed into a 2D space having a first dimension for each data record's start time and a second dimension for each data record's end time. Historical queries specifying data ranges are obtained. A response was previously sent for each historical query and specifying a sub-portion of data records that overlap with such historical query's specified data range. Partitioning schemes for the current data records in the 2D space are generated. An optimum partitioning scheme having a lowest cost is selected based on costs of executing the historical queries with respect to each of the partitioning schemes. The optimum partitioning scheme is applied on the current data records, including newly received data records, in the 2D space so that any subsequently received queries are applied against the current data records as partitioned by the optimum partitioning scheme in the 2D space.

25 Claims, 18 Drawing Sheets

(56) References Cited

OTHER PUBLICATIONS

"Interval Tree", Wikipedia, Retrieved from the Internet: <https://web.archive.org/web/20120622091326/https://en.wikipedia.org/wiki/Interval_tree >, Accessible Jun. 2012, 11 pgs.

Bentley, Jon L., "Multidimensional Binary Search Trees Used for Associative Searching", Association for Computing Machinery, Inc., vol. 18, No. 9, 1975, pp. 509-517.

Guttman, Antonin, "R-Trees: A Dynamic Index Structure for Spatial Searching", ACM 0-89791-128-8/84/006/0047, 1984, pp. 47-57.

Okcan, Alper et al., "Processing Theta-Joins using MapReduce", SIGMOD, Athens Greece, ACM 978-1-4503-0661-4/11/06, 2011, 12 pgs.

Olston, Christopher et al., "Pig Latin: A Not-So-Foreign Language for Data Processing", SIGMOD, Vancouver, BC, Canada, ACM 978-1-60558-102-6/08/06, 2008, 12 pgs.

Samet, Hanan, "The Quadtree and Related Hierarchical Data Structures", Computing Surveys, vol. 16, No. 2, Jun. 1984, pp. 187-260.

Thusoo, Ashish et al., "Hive—A Warehousing Solution Over a Map-Reduce Framework", VLDB, Lyon, France, ACM 978-1-4503-0661-4/11/06, 2009, 4 pgs.

Vernica, Rares et al., "Efficient Parallel Set-Similarity Joins Using MapReduce", SIGMOD, Indianapolis, Indiana, ACM 978-1-4503-0032-2/10/06, 2010, 12 pgs.

\* cited by examiner

HORIZONTAL INTERVAL-BASED DATA PARTITIONING AND INDEXING FOR LARGE CLUSTERS

TECHNICAL FIELD OF THE INVENTION

The present invention relates to data analytics, and more specifically to partitioning large amounts of data for range interval queries.

BACKGROUND

There are numerous examples of data records to which interval queries, such as time interval, may be applied. In an online advertisement context, anonymized data may be collected for online users. Data may be collected for various user online activities, such as user interactions with respect to online advertisements, as well as other types of online interactions. The stored user data is typically associated with various time intervals for various user interactions. Other applications that may include the storage of large amounts of time interval data include television, telecom, and customer support interactions.

SUMMARY OF THE INVENTION

The following presents a simplified summary of the disclosure in order to provide a basic understanding of certain embodiments of the invention. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In general, certain embodiments of the present invention provide mechanisms for partitioning a set of data records having a plurality of ranges to which a plurality of queries for specific ranges can be applied are disclosed. In one embodiment, current data records, which each has a start time and an end time, are transformed into a two dimensional (2D) space having a first dimension upon which each data record's start time is mapped and a second dimension upon which each data record's end time is mapped. Historical queries that each specifies a data range are obtained. A response was previously sent for each historical query and specifies a sub-portion of the current data records that overlap with such historical query's specified data range. Partitioning schemes are generated for the current data records in the 2D space. An optimum one of the partitioning schemes is selected based on the costs of executing the historical queries with respect to each of the partitioning schemes, and the optimum partitioning scheme has a lowest cost of the partitioning schemes. The optimum partitioning scheme is applied on the current data records, including newly received data records, in the 2D space so that any subsequently received queries are applied against the current data records as partitioned by the optimum partitioning scheme in the 2D space.

In a specific implementation, the operations for generating a plurality of partitioning schemes and selecting an optimum one of the partitioning schemes are repeated every predefined time period. In another embodiment, the operations for generating a plurality of partitioning schemes and selecting an optimum one of the partitioning schemes are repeated in response to a change in a query workload arising above a predefined amount. In one aspect, the generated partitioning schemes have or are filtered to have a partition count that is within a predefined range of count values.

In another implementation, generating the partitioning schemes includes generating sequential generations of partitioning schemes so that each generation, except a first one of the generations, is based on altering a previous generation. In a further aspect, generating the partitioning schemes is performed by (i) randomly generating the first generation of partitioning schemes, (ii) determining a cost of each partitioning scheme of the first generation, (iii) generating a next generation of partitioning schemes by altering a fittest fraction of the first generation, wherein the fittest fraction includes a sub-portion of the first generation's partitioning schemes having a lowest cost, and (iv) repeating the operation for generating a next generation of partitioning schemes by altering a fittest fraction of a previous next generation until it is determined to stop searching for the optimum partitioning scheme. In yet another embodiment, it is determined to stop searching for the optimum partitioning schemes when a lowest cost one of each most recently generated two or more sequential next generations remains the same more than a predefined time period or number of generations. In another aspect, altering the fittest fraction includes performing one or more combinations of cross-over or mutation operations. In another example, the generations of partitioning schemes include grid-based partitioning schemes. In another aspect, the generations of partitioning schemes include tree-based partitioning schemes. In a further aspect, the tree-based partitioning schemes are generated based on a greedy algorithm. In another embodiment, the generations of partitioning schemes include grid-based partitioning schemes and tree-based partitioning schemes.

In another embodiment, the invention pertains to a system having at least a processor and a memory. The processor and/or memory are configured to perform one or more of the above described operations. In another embodiment, the invention pertains to at least one non-transitory computer readable storage medium having computer program instructions stored thereon that are arranged to perform one or more of the above described operations.

These and other features of the present invention will be presented in more detail in the following specification of certain embodiments of the invention and the accompanying figures which illustrate by way of example the principles of the invention.

DETAILED DESCRIPTION OF THE SPECIFIC EMBODIMENTS

Figure 1:
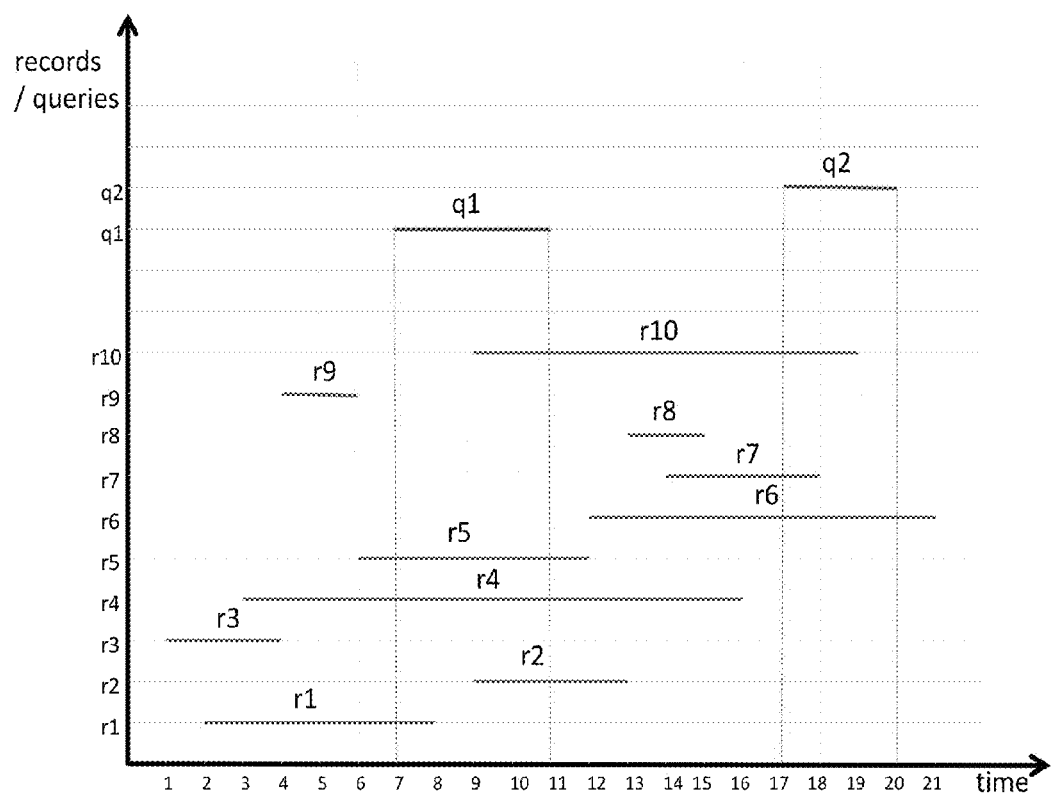
FIG. 1 illustrates a query for data records having specific time intervals.

In the following description, numerous specific details are set forth in order to provide a thorough understanding of the present invention. The present invention may be practiced without some or all of these specific details. In other instances, well known process operations have not been described in detail to not unnecessarily obscure the present invention. While the invention will be described in conjunction with the specific embodiments, it will be understood that it is not intended to limit the invention to the embodiments.

Various techniques and mechanisms of embodiments of the present invention are described herein in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

A wide range of applications exist for big data analytics with associated challenges. Running queries on large amounts of data generally involves scanning very large amounts of data to perform filtering, grouping, aggregation, and so on, which can lead to very high response times. Techniques for reducing the amount of data scanned during query processing can focus on either introducing traditional database indexing at the record-level or on filtering out entire partitions in case the query has some filtering criteria defined on the partition key. However, traditional index structures e.g., B-Tree and R-Tree, are centralized by nature, and are not effectively deployed and used in a distributed environment. Additionally, it is often difficult to implement efficient queries for big data with respect to time or spatial intervals.

In a digital advertising example, marketing campaigns often rely on the collection and tracking of user profile and event data for specific users. There are various ways to collect and manage user data. As users interact with various applications over time using various devices, these applications may anonymously assign user identifiers (IDs) for such users. For example, an on-line application may assign a random string as a user ID to a particular user that interacts with such application or web site (e.g., such as accessing a web page), and the assigned user ID is stored, for example, as part of a cookie on the particular user's device. Each time the user interacts with an application or web site for which a cookie has been stored, the user ID can be retrieved via the previously stored cookie and associated with user profile and event data, which may pertain to a user's on-line activities and one or more user characteristics, for a specific time range of user activity. Other techniques, such as login processes or device identifiers, may also be used to track particular users via a unique user ID.

This user event data can later be analyzed to try to glean insights related to how different users and user segments respond to the different marketing stimuli. In this application, a user profile can be considered as a range data record, whose range is defined by its lifetime; i.e. from the time the profile was created until the time of its last activity or any sub-portion time period therein. Similarly, queries typically have time ranges; e.g., the duration of the campaign being analyzed. Other types of range data may include income ranges, age ranges, etc.

Big data analysis in the context of range intervals also extends to other online applications, such as publishers—e.g., social network services or mobile apps—where such providers desire to better understand the way their users interact with their websites or apps, either for advertising purposes or for improving the user experience. In this context, individual user sessions can also be regarded as range data records.

The television industry has some similarities to the online world. Specifically, the set-top boxes installed in homes by the TV service provider keep track of the channels it is tuned to and for how long. All those range data records are typically sent back to the service provider for warehousing and analytics. Some of the common queries against this type of data may include trying to get a break down of the viewership for a certain TV program or TV ad. Clearly, those queries are range queries.

In a telecom application, calls made via cell phones can normally span multiple locations and, hence, multiple cell towers. Wireless telecom companies need to keep track of those call records, which also have associated time ranges, for billing purposes as well as for load monitoring and capacity planning for their wireless networks. Examples of analysis queries on this type of data may include a query returning a breakdown of call traffic by cell tower and customer demographics within a given period of time.

In another application, customer support tickets normally take some time before such tickets are closed. The ticket data is often stored and the subject of a lot of analysis—for example, to understand the average response types to customers in certain classes of issues or by certain call agents. Also, those analyses can be limited to a certain time period.

Certain embodiments of the present invention facilitate big data queries across range or intervals by transforming the data space into a partitioned data space that can be efficiently queried across data ranges. Given some query workload and a set of data records, where both the queries and data records are characterized by some interval information (e.g., time intervals) such that each query results in data records with overlapping intervals, the data records are partitioned in a way that minimizes the execution time of the queries. The data records can be partitioned to facilitate the splitting of such data across multiple machines, on which such data is processed.

FIG. 1 illustrates a query for data records having specific time intervals. The data records and queries are plotted as a function of time. Specifically, FIG. 1 illustrates 10 different range data records, r1 . . . r10, and two range queries, q1 and q2. The ranges for both data records and queries are considered to be time intervals in this scenario. However, other types of queries and data records may pertain to other types of ranges, such as income ranges, age ranges, etc.

As illustrated in FIG. 1, these records and queries are plotted in a regular 1D space. It can be easily observed from FIG. 1 that it is impossible in this 1D space to partition this data into two or more non-overlapping partitions, without data duplication or splitting. For example, there is no single partitioning point that would cleanly separate the data records into two different groups—let alone a higher number of groups. That is, the only solutions for partitioning the data records of FIG. 1 are to allow partitions to overlap or data records to duplicate or split.

Data partitioning with overlapping partitions or data records that are duplicated or split are not conducive to performing big data queries with respect to range data. For example, record duplication in the context of very large data sets can be associated with potentially large space overhead and also require significant processing overhead at query time just to de-duplicate the results. Allowing partitions to overlap may cause similar resource issues. When a query's range touches a region that belongs to the overlap of multiple partitions, then all of the overlapping partitions will have to be scanned during a query for a time interval pertaining to such overlapping partition portion, and thereby substantially increasing the overhead.

Splitting data records across partitions can also have associated problems. One concrete example is the user profiles example. In this case, if two partitions cover two different time ranges and the same user spans both ranges, then the profile is split into two parts, such that each partition will only contain the part with events occurring within the partition's time range. Unfortunately, when the complete profile needs to be analyzed, a very expensive join needs to be performed across the different parts of each profile. In fact, a joining process defeats the whole purpose of building user profiles, which are to group the data that would normally to be analyzed together ahead of time.

Figure 2:
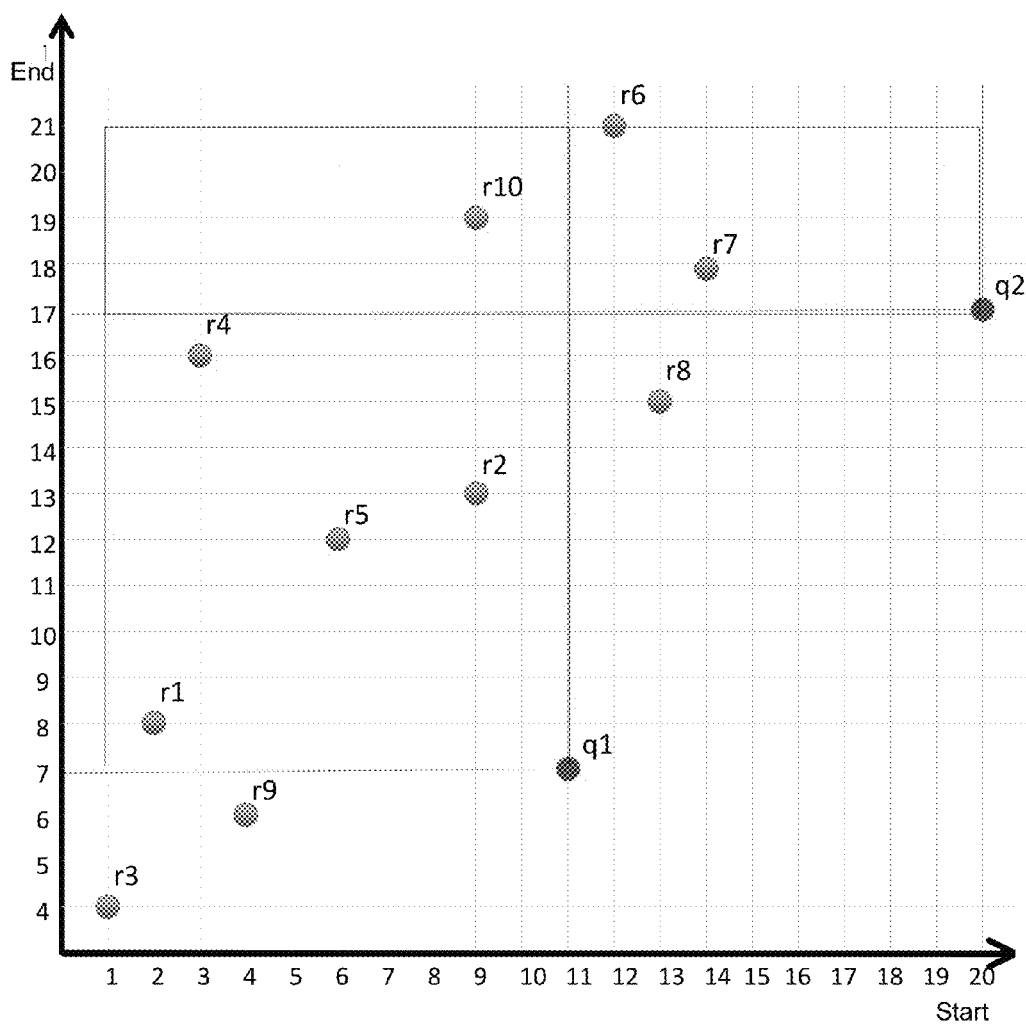
FIG. 2 represents a 2D transformation of the 1D data record space of FIG. 1 in accordance with one embodiment of the present invention.

In contrast, transforming the 1D space into a 2D space can allow data record partitioning without overlapping partitions or duplicated or split data records. FIG. 2 represents a 2D transformation of the 1D data record space of FIG. 1 in accordance with one embodiment of the present invention. Each record has a start value and an end value that can be mapped to a first dimension and a second dimension, respectively, to form a 2D space as shown in FIG. 2. In effect, every range data record in the 1D space (e.g., FIG. 1) will now become a data point in the 2D space (e.g., FIG. 2).

Any overlapping records in the 1D space are now transformed to a data point falling inside a particular query's rectangular range. Note that a record's range will only overlap with the query's range when both its start value is less than or equal to the query's end value and its end value is greater than or equal to the query's start value. Thus, in the 2D space, the width of the query rectangle can span all possible start values from the minimum such value (1 for record r3 in FIG. 2) to the query's end value. Similarly, the height of the query rectangle can span all the possible end values from query start value to the maximum possible end value for the record set (21 for record r6 in FIG. 2).

Each specific query result can be represented by a rectangular range in the 2D space of FIG. 2. As shown, query q1's range is [7,11] in the 1D space. This query range ideally results in retrieving data records in the rectangle whose top left corner is (1, 21) and whose bottom right corner is (11,7). Similarly, q2's range in the 1D space is [17,20], while its result rectangle in the 2D space has (1,21) as its top left corner and (20,17) as its bottom right corner. In FIG. 1, q1 overlaps with r1, r2, r4, r5, and r10, whose corresponding data points in FIG. 2 are enclosed inside q1's rectangle. The same relationship applies between q2 and records r6, r7, and r10.

All queries can be defined to share the same top left corner, which is the top left corner of the entire 2D space. Therefore, each query can be uniquely identified by its bottom right corner, which is the data point corresponding to its range's end and start values (the boundaries in reverse order).

Prior to performing queries, the resulting 2D space can be partitioned to facilitate efficient data record queries. The cost of executing a query can be estimated by the number of records that are to be scanned for a particular number of queries. Thus, one optimization goal can be to partition the data in a way that minimizes the number of retrieved records for a given query workload. The cost or quality of a particular partitioning layout can be estimated by the amount of records the queries of the workload will have to retrieve. More formally, given a partitioning layout, say L, the cost can be determined by:

$$\text{Cost}(L) = \Sigma_{\forall p \in L} O_q(p) \times C_r(p) \qquad \text{Equation [1]}$$

where $O_q(p)$ is the number of queries that overlap with Partition p, and $C_r$ is the count of records in p.

Figures 3A, 7:
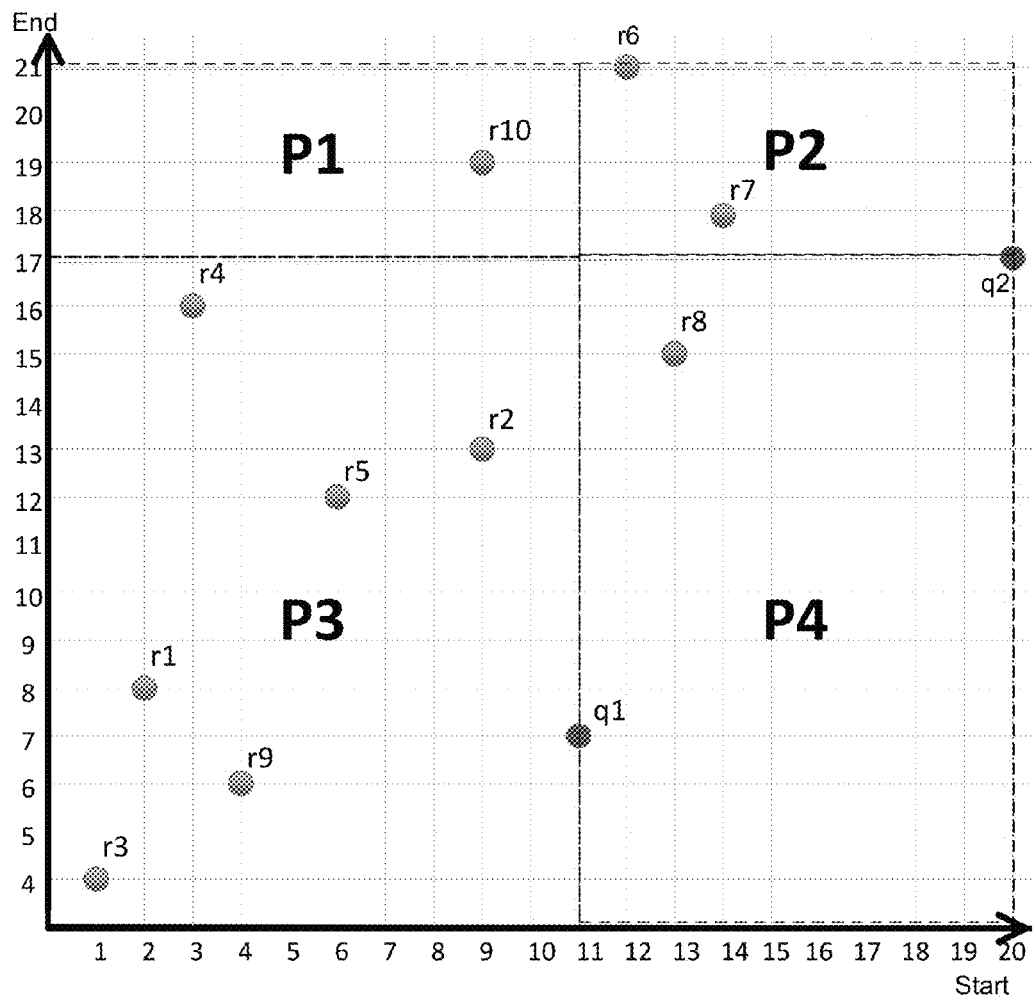
FIG. 3A illustrates an example of a grid-based partitioning scheme for the data records within the 2D space of FIG. 2 in accordance with one embodiment of the present invention.
FIG. 7 illustrates an example pair of bit strings (chromosomes) that represent the partitioning scheme of FIG. 3A in accordance with one embodiment of the present invention.
Figure 3B:
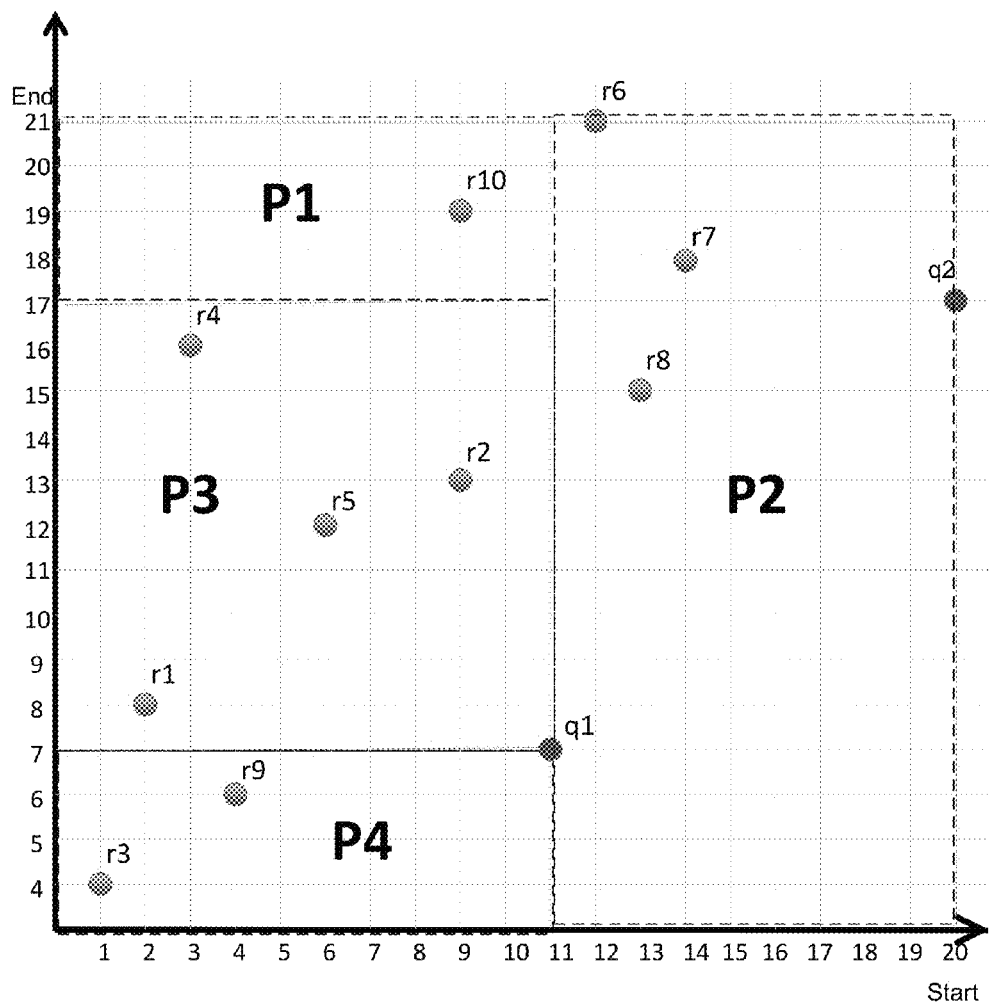
FIG. 3B illustrates an example of a tree-based partitioning scheme for the data records within the 2D space of FIG. 2 in accordance with an alternative or additional embodiment of the present invention.

In general, when a particular query overlaps with a particular partition, all records in the particular partition are scanned to find the records having the queried range. FIGS. 3A and 3B illustrate two different types of partitioning schemes for the data records within the 2D space of FIG. 2. For the first partitioning scheme of FIG. 3A, partitions P1 and P3 are scanned for query q1, while partitions P1 and P2 are scanned for query q2. Partition P1 has a single record r10, while partition P3 has records r1, r2, r3, r4, r5, and r9. Partition P2 has records r6 and r7. Although records r3 and r9 are not relevant for either query, these records are scanned for query q2 since it belongs to overlapping partition P3. Using Equation 1, the cost of the partitioning scheme of FIG. 3A is equal to 10, which is the result of 2 (number queries that scan P1)×1 (number of P1 records)+1 (number of queries that scan P2)×2 (number of P2 records+1 (number of queries that scan P3)×6 (number of P3 records).

For the partitioning scheme of FIG. 3B, query q1 overlaps partition P3 and P1 and, hence, scans records r1, r2, r4, r5, and r10. Query q2 overlaps with partition P1 and P2 and results in the scanning of records r6, r7, r8, and r10. In contrast to the scheme of FIG. 3A, records r3 and r9 are not scanned since their partition P4 does not overlap with either query q1 or q2. There is only a single irrelevant record r8 that is scanned for query q2, as compared with the scheme of FIG. 3A that resulted in scanning of two irrelevant records r3 and r9. Using Equation 1, the cost of the partitioning scheme of FIG. 3B is 9, which results from 2 (or number of queries for P1)×1 (number of data records in P1)+1 (or number of queries for P2)×3 (number of records in P2)+1 (or number of queries for P3)×4 (number of records for P4). Thus, the partitioning scheme of FIG. 3B has a lower cost than the scheme of FIG. 3A.

Any suitable technique may be used to evaluate one or more sets of partitioning schemes for the 2D data record space to find one or more optimal partitioning schemes, besides Equation 1. In general, the evaluation can be based on determining a cost of each partitioning scheme based on current data records and historical queries. For example, three months of past queries can be applied to different ones of potential partitioning schemes to determine the resulting cost for using the different partitioning schemes. The optimal partitioning scheme can be based on a total cost, for example, as expressed by Equation 1 or an overhead quantity, such as the number of irrelevant data records that are scanned by the set of historical queries. Other evaluation metrics or qualifiers for evaluating each partition scheme are contemplated.

Figure 4:
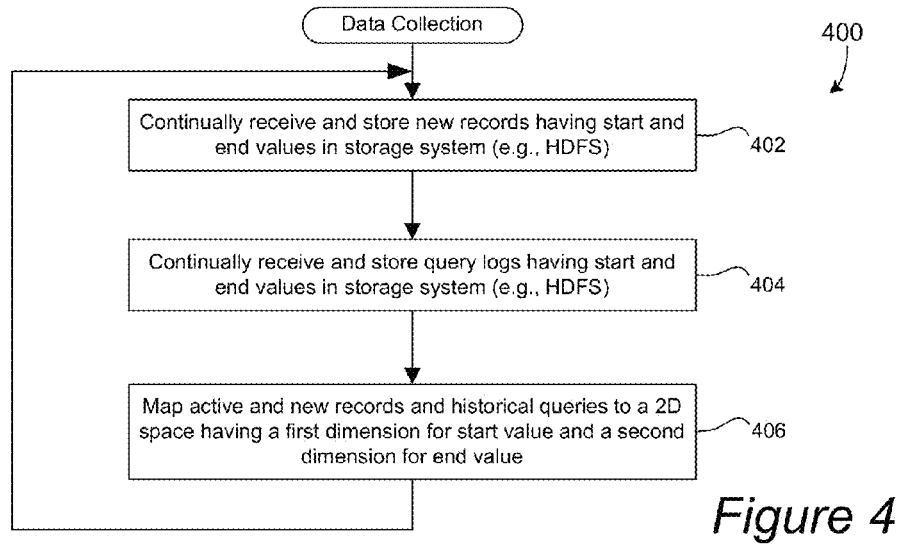
FIG. 4 is a flow chart illustrating a data collection process in accordance with one embodiment of the present invention.

FIG. 4 is a flow chart illustrating a data collection process 400 in accordance with one embodiment of the present invention. New data records may be continually received and stored in a storage system, such as a Hadoop Distributed Filing System (HDFS), in operation 402. Example systems for implementing various portions of data collection, as well as processing and analytics, are further described below. The storage system may already include active data records that have been previously received or collected. Query logs from past queries may also be continually received and stored in a storage system in operation 404. The data records and query logs each include at least one pair of a start and end value, e.g., a time range.

The storage system may be divided into any suitable types and number of storage areas, such as an active and a staging area. For example, new data records may continually be received into a staging area before being stored in the active area from which the data records are made available for queries. Movement of data records from the staging area to the active area may be prompted by any suitable trigger, such as by expiration of a predefined time period.

Active and new records and historical queries may also be mapped to a 2D space having a first dimension for start values and a dimension for end values in operation 406. For example, the records and queries are mapped to a 2D space as shown in FIG. 2. The data collection process is typically an ongoing process for continually receiving or collecting new data.

Figure 5:
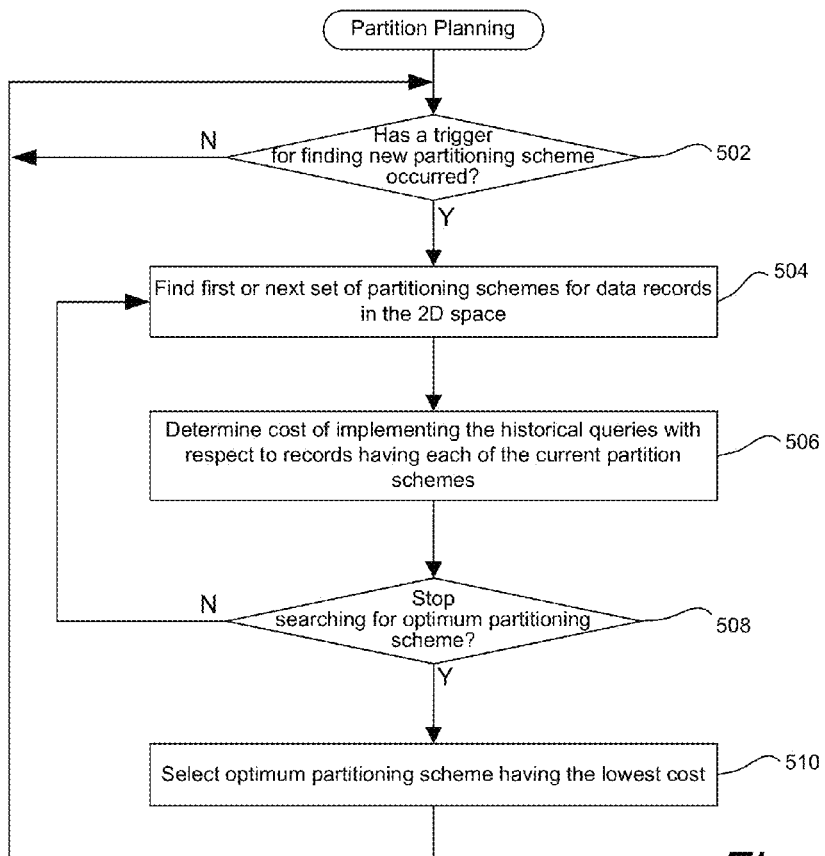
FIG. 5 is a flow chart illustrating a partition planning process in accordance with one embodiment of the present invention.

FIG. 5 is a flow chart illustrating a partition planning process 500 in accordance with one embodiment of the present invention. It may initially be determined whether a trigger for finding a new partitioning scheme has occurred in operation 502. In one embodiment, a search for a new partitioning scheme may commence after a predefined period of time, such as weekly or monthly. The predefined period may be based on the anticipated rate of change in the query workload pattern. The anticipated rate of change may be predicted based on past rate of change in the query workload pattern. Alternatively, changes in the actual query workload pattern may be dynamically and continuously tracked. A partitioning scheme search may be triggered when the workload changes (or increases) by more than a predefined percentage amount (e.g., 10%) of the number of queries, the total query cost, etc.

When a partition planning process has been triggered, a first set of partitioning schemes for the data records in the 2D space may be found in operation 504. The initial set of partitioning schemes may be generated randomly or generated based on any suitable partitioning process. The initial set of partitioning schemes may also include the currently implemented partitioning scheme.

Any partition scheme that is to be assessed may be selected to also conform with particular restraints so as to minimize problems that may occur with handling and processing large data. For instance, allowing too many small partitions can be very harmful to the overall health of a Hadoop cluster. In particular, the name node in charge of the Hadoop File System (HDFS) keeps track of the individual blocks comprising the files stored on HDFS. Thus, the name node can be a central shared resource in the cluster. When the name node gets overloaded, it will slow down the whole cluster. Therefore, it is a common practice in Hadoop to use large block sizes—in the order of hundreds of MBs—and also to avoid files that are much smaller than a single block size. To this end, the partitioning scheme planning process may incorporate use of parameter $K_t$ for a target number of partitions. The target number of partitions, $K_t$, may be selected by a user in one embodiment. Minimum and maximum partition size parameters may also be utilized during the planning process. Example minimum and maximum partition sizes can be 1 GB and 10 GB, respectively.

While $K_t$ may be used to guide a partitioning algorithm, the actual number of partitions, $K_a$, may end up being different from $K_t$. The reason for this discrepancy is that setting of minimum and maximum partition sizes can tend to impact the final number of partitions so that the target partition number $K_t$ is not met in all cases. In one example embodiment, Ka may be bounded with respect to $K_t$, for example, by $K_t \leq K_a \leq 2 \times K_t$. In certain implementations, the size of each partition in an output partitioning scheme falls between the minimum partition size and the maximum partition size. Additionally, the actual number of partitions does not exceed double the target number of partitions in this embodiment.

The minimum size constraint can be enforced by a filtering process that only allows a partitioning scheme to be considered if all of its partitions satisfy this constraint. The maximum size constraint may be satisfied through a post-processing step. For instance, it may be determined that if the size of a large partition in the final partitioning scheme exceeds the maximum partition size, such large partition may be further partitioned uniformly into a number of sub-partitions given by the ratio of its size to maximum partition size. The large partition may alternatively be further partitioned into non-uniform sub-partitions.

Note that the worst case in terms of partitions imbalance in the output partitioning scheme (prior to splitting large partitions) will happen when all partitions are virtually empty, except for one very large partition that almost has all of the data records. In this case, that large partition will be further split a maximum of $K_t$ times, leading to an actual number of partitions, $K_a=2\times K_t$.

Referring back to FIG. 5, the cost of implementing the historical queries with respect to the records having each of the current partitioning schemes may then be determined in operation 506. For example, Equation 1 may be used to determine the cost of implementing all or a portion of the historical queries with respect to each data record partitioning scheme.

It may then be determined whether to stop searching for an optimum partitioning scheme in operation 508. Stopping the partition scheme search may be based on any factors. By way of example, a stop may be triggered after a particular number of schemes are evaluated, after a predetermined time period, after the lowest cost scheme remains the same after a specified time period, evaluation cycles, or generations are created, etc.

If the search for an optimum scheme is to continue, a next set of partitioning schemes may then be found in operation 504. For instance, the best performing schemes from the first set of partitioning schemes may be selected and altered to generate the next set of partitioning schemes as described further below.

After it is determined that the search process is to stop, an optimum partitioning scheme that has the lowest cost may be selected in operation 510. The data partitioning planning process 500 may then be repeated after occurrence of another trigger event (e.g., 502).

Implementation of the optimum partitioning scheme may occur at any suitable frequency and may likely differ from the frequency of the partitioning planning process. In one embodiment, the new optimum partitioning scheme is applied for the active data records, including newly received records, at the end of each day. If the new optimum partitioning scheme differs from the current partitioning scheme, the current partitioning scheme is replaced by the new optimum partitioning scheme.

The data partitioning scheme may be implemented as a map-reduce job, where the mappers read different chunks of records and then send each record to the appropriate reducer, which will ultimately write the corresponding partition file to HDFS. In one embodiment, data partitioning may be treated as an atomic transaction in the sense that all output partition files are first written to a temporary directory. In this embodiment, the old active directory is deleted and the temporary directory is renamed to replace it only when partitioning is complete. If any failures occur during partitioning, the temporary directory can then be deleted and the process can be repeated.

Any suitable type of partitioning schemes may be evaluated during the planning process. Example partitioning schemes include grid-based genetic approaches, tree-based genetic approaches, etc.

Figure 6:
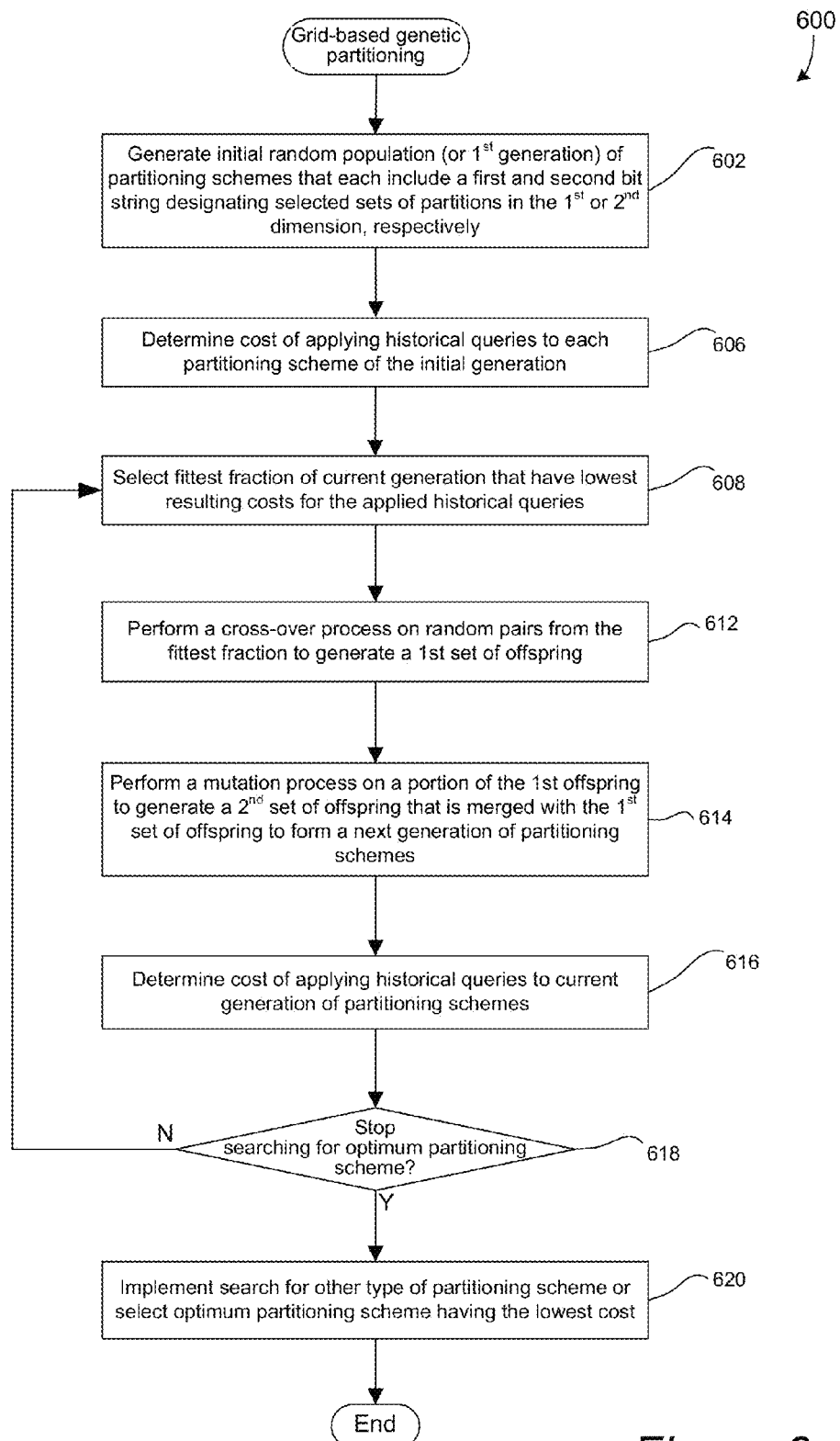
FIG. 6 is a flow chart illustrating a grid-based genetic partitioning process in accordance with a specific implementation of the present invention.

An example of a grid-based partitioning scheme is given in FIG. 3A. In this type, the partitions form a coarse-grained grid structure that is overlaid on top of the original fine-grained grid of the 2D space. FIG. 6 is a flow chart illustrating a grid-based genetic process 600 in accordance with a specific implementation of the present invention. An initial random population (or $1^{st}$ generation) of partitioning schemes may be generated in operation 602. Each partitioning scheme in this first generation can be represented by a first and second bit string designating selected sets of partitions in the $1^{st}$ and $2^{nd}$ dimension, respectively, of the 2D data record space. Other representations of the $1^{st}$ and $2^{nd}$ dimension partitions may be used. In a grid-based genetic approach, the bit strings can be referred to as "chromosomes", to which mutations and cross-overs can be applied.

In a specific genetic approach example, the partitioning scheme of FIG. 3A can be represented using a pair of bit strings, $B_1$ and $B_2$, with lengths $(N_1-1)$ and $(N_2-1)$ for the first and second dimensions respectively. FIG. 7 illustrates an example pair of bit strings $B_1$ and $B_2$ that represent the partitioning scheme of FIG. 3A in accordance with one embodiment of the present invention. Each bit will denote either a row or a column in the original grid of FIG. 3A. A set bit (1) indicates that the corresponding row or column acts as a borderline between partitions. For example, in FIG. 3A, bit 11 of the $B_1$ bit string is set to 1 and bit 14 of the $B_2$ bit string is set to 1 so as to indicate the vertical and horizontal partition lines, respectively, in the 4-partitions scheme depicted in FIG. 3A. (Note that the indices/numbers below the bits in FIG. 7 denote the positions and not the actual values of the first and second dimensions of FIG. 3A.)

The two bit strings of a random initial partitioning scheme may be determined using any suitable technique. Initially, a target number of partitions $K_t$ along with the cardinalities of the two dimensions in the 2D space are provided. A random pair of partition numbers, $K_1$ and $K_2$, such that $K_1\times K_2=K_t$, may be selected for the $1^{st}$ and $2^{nd}$ dimension, respectively. The bit strings $B_1$ and $B_2$ may then be randomly generated with a total number of bits equal to $N_1$ and $N_2$, of which $(K_1-1)$ and $(K_2-1)$ are set, respectively.

A cost of applying the historical queries to the initial generation of partitioning schemes may then be determined in operation 606. The cost may be determined by Equation [1] or any other suitable technique. A most fit fraction of the current generation may then be selected in operation 608. The fittest fraction may be selected based on the lowest resulting costs for the applied historical queries. Any suitable fraction, such as the bottom 30 percentile, may be used. The fraction value can also be determined based on past results for finding partitioning schemes. For example, if the past results show that selection of the fittest 5% would have led to a quick and accurate determination of the optimum partitioning scheme and the fraction percentage is currently set higher than 5%, the fraction for the fittest fraction may be lowered to 5%.

Various cross-over and mutation processes may be performed on any combinations of the fittest fraction in any suitable order. The cross-over process may be performed on a first portion of the fittest fraction, while the mutation process is performed on a second portion of the fittest fraction.

In the illustrated example, a cross-over process may be performed on the fittest fraction to generate a 1st set of offspring in operation 612. Given a pair of partitioning schemes, $K_1$ and $K_2$ can be selected for their child, the selected partition number $(K_1, K_2)$ pair can be chosen out of all valid $(K_1, K_2)$ pairs, such that it is different from the parent $(K_1, K_2)$ pairs, and closest to their midpoint. If the parent $(K_1, K_2)$ pairs are (20, 1) and (5, 4) for a target total of 20, then their midpoint is (12.5, 2.5), and the pair that is closest to the midpoint between the parents $(K_1, K_2)$ pairs is the (10, 2) pair, which is selected from valid pairs (1, 20), (2, 10), (4, 5), and (10, 2). This strategy is more effective than just randomly picking any valid pair for the child.

In the next step, $B_1$ and $B_2$ can be constructed for the child $(K_1, K_2)$ pair by first ORing the $B_1$'s of the parents and the $B_2$'s of the parents respectively. Finally, a sufficient number of random bits can be set or reset to ensure that $B_1$ and $B_2$ for the child have exactly $(K_1-1)$ and $(K_2-1)$ set bits.

A mutation process may then be performed on a portion of the $1^{st}$ offspring to generate a $2^{nd}$ set of offspring of partitioning schemes in operation 614. A mutation operation may be performed simply by swapping a random 0-bit and a random 1-bit in each of the $B_1$ and $B_2$ bit strings of the input partitioning scheme. The $2^{nd}$ set of offspring from the mutation process can be merged with the $1^{st}$ offspring from the crossover process to form a next generation of partitioning schemes. The merged next generation may include all of the $1^{st}$ offspring or only the non-mutated $1^{st}$ offspring.

The cost of applying historical queries to the current generation of partitioning schemes may then be determined in operation 616. The cost may be determined by any suitable manner, such as Equation [1]. It may then be determined whether the search for an optimum partitioning scheme is to stop in operation 618, for example, as described above. A search for another type of partitioning scheme may be implemented in operation 620. For example, the cost results for the current merged partition schemes may be stored for evaluation with the results of another set of partitioning schemes that were found using another type of process. For instance, the optimum scheme may be selected from a set of grid-based schemes and another set of tree-based schemes. Alternatively, the optimum partitioning scheme having the lowest cost may be selected in operation 620, for example, from a most recently determined set of schemes, which may include any number and type of grid-based schemes or tree-based schemes, etc.

In an alternative embodiment, a dynamic algorithm may be utilized to generate each $2^{nd}$ bit string B2, rather than randomly generating such $2^{nd}$ bit string. In general, an optimal 1D partitioning scheme may be efficiently determined without using any approximation methods. If B2 can only have K2 set bits, then the last set bit can have several valid positions. At a high level, a dynamic programming matrix, M, may be built, where one axis represents the cardinality of the second dimension in the 2D space (i varied from 1 to $N_2$), and the second axis represents the target number of partitions for that dimension (j varied from 1 to $K_2$). The matrix may be built by incrementally computing the costs for all valid combinations across the two axes. During initialization, no partitioning is considered (j=1). Then, the cost for each subsequent cell in the matrix can be computed by finding the minimum across multiple sums of costs, as described above. Finally, when the entire matrix is computed, the minimum cost for the whole problem can be found in $M[N_2,K_2]$. The optimal B2 can then be derived by retracing the computation from $M[N_2, K_2]$ back to $M[1, 1]$.

To compute the time complexity for this algorithm, note that there are $O(N_2 \times K_2)$ valid cells in the matrix. Moreover, the number of smaller sub-problems required to compute each cell is $O(N_2)$. Thus, the total time complexity is $O((N_2)^2 \times K_2)$. Considering that this algorithm can be called a fairly large number of times by the genetic algorithm, it can be potentially slow as compared to the above described genetic grid-based approach.

In an alternative or additional partitioning approach to a grid-based approach, FIG. 3B is an example of the more general tree-based partitioning scheme in accordance with another embodiment of the present invention. The example also has four partitions P1~P4, but these partitions do not conform to a grid structure. One main difference between grid-based and tree-based partitioning schemes can be in the way the partitioning schemes are represented, and consequently the related operations of generating new random partitioning schemes, crossovers, and mutations.

Figure 8A:
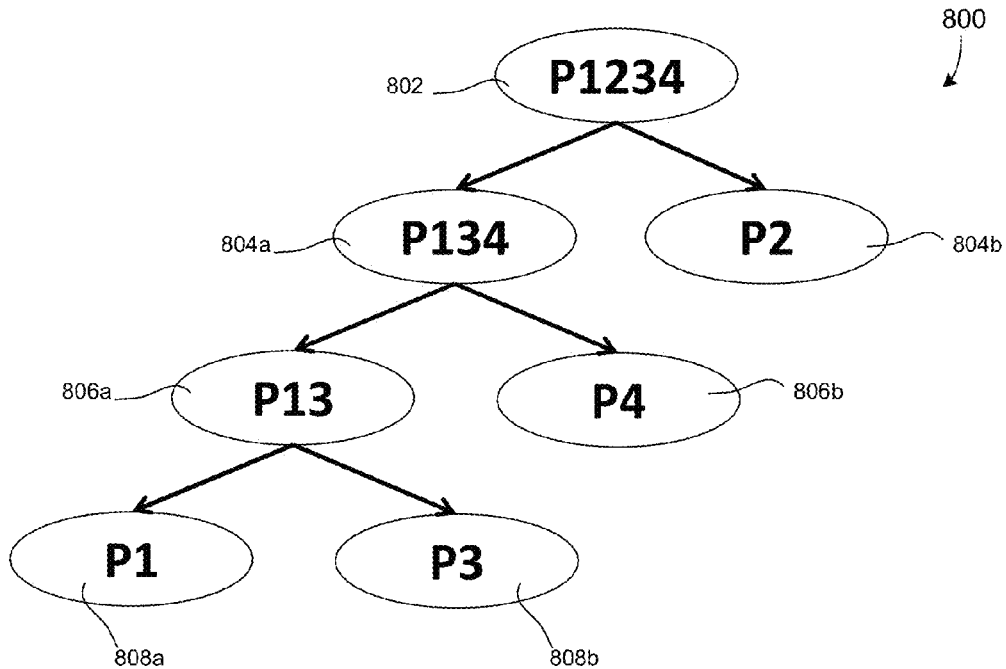
FIG. 8A illustrates a first binary tree for the partitions of FIG. 3B in accordance with one embodiment of the present invention.
Figure 8B:
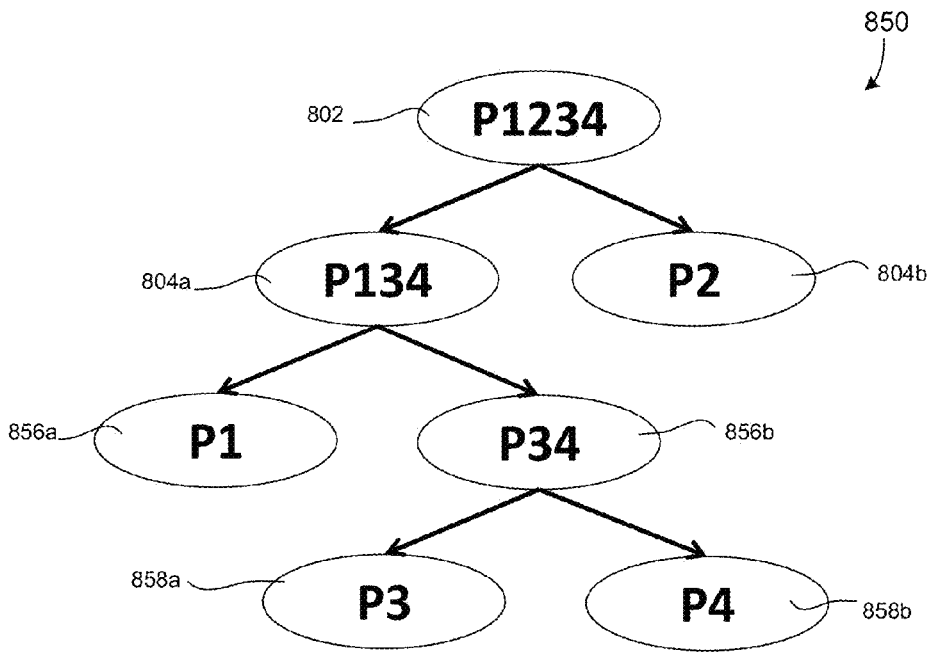
FIG. 8B illustrates a second binary tree for the partitions of FIG. 3B in accordance with another embodiment of the present invention.

Tree-based partitioning schemes can be represented as binary trees, where the leaf nodes capture the final partitions, while the internal nodes capture the parent enclosing partitions, whose splitting result into smaller child partitions. FIGS. 8A and 8B illustrate two different tree-based partitioning schemes for the data records of FIG. 3B. In both of these trees, the root node P1234 (802) represents a large partition covering the entire 2D space. Then, the root node 802 is split into two smaller partitions captured by its two child nodes 804a and 804b. Similarly, the children of each internal node are the outcome of splitting the partition it represents into two partitions, and so on. In the first tree of FIG. 8A, the child node P134 (804a) is further split into children P13 (806a) and P4 (806b), while the child P13 (806a) is again split into child nodes P1 (808a) and P3 (808b). In the second tree of FIG. 8B, the child node P134 (804a) is split into child nodes P1 (856a) and P34 (856b), while child node P34 (856b) is again split into child nodes P3 (858a) and P4 (858b).

The tree-based genetic algorithm can use a similar process for finding partitions as the grid-based genetic technique. A random set of initial partitioning schemes may first be created. For instance, a single-node tree, whose root is the partition covering the entire 2D space, may be initially created. The process may choose and split a random leaf node into two partitions to form such random leaf node's two children (the random leaf node is now an internal node). This process repeats until exactly $K_t$ leaf partitions are created. Various genetic operations, such as cross-over and mutation operations, can then be performed on all or a most fit portion of the randomly generated initial set of partitioning schemes so as to form new tree-based partitioning schemes.

Figure 9:
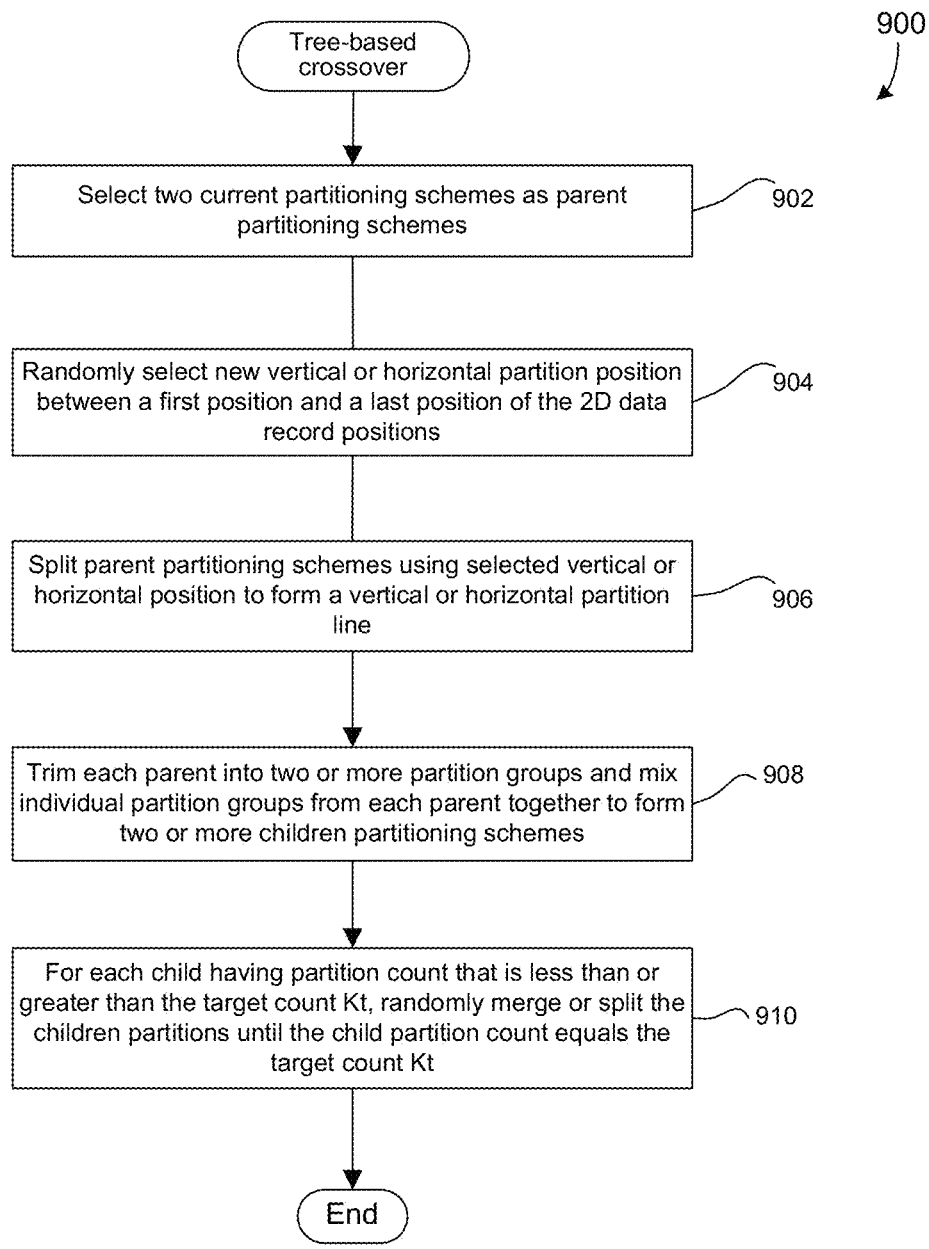
FIG. 9 is a flow chart illustrating a crossover process for application to tree-based partitioning schemes in accordance with a specific implementation of the present invention.
Figure 10A:
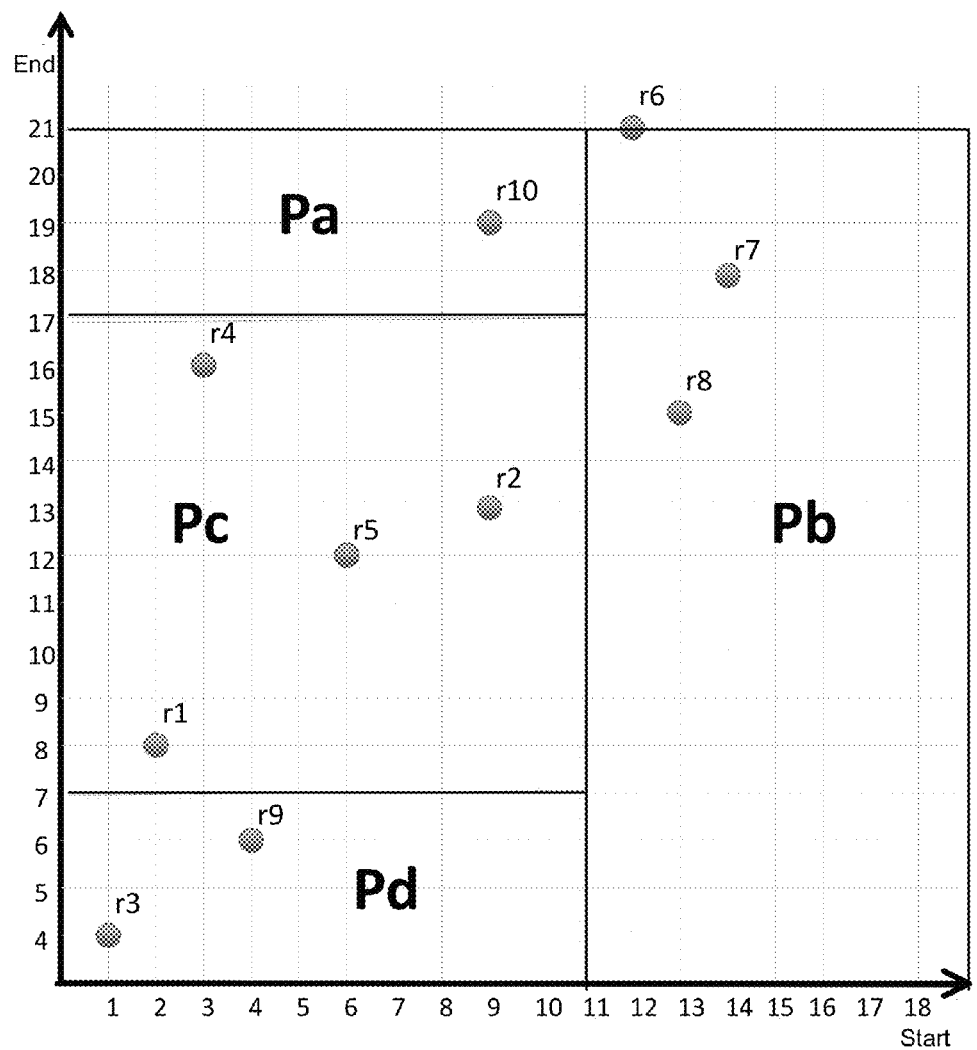
FIG. 10A illustrates a first tree-based parent partitioning scheme in accordance with one example implementation of the present invention.
Figure 10B:
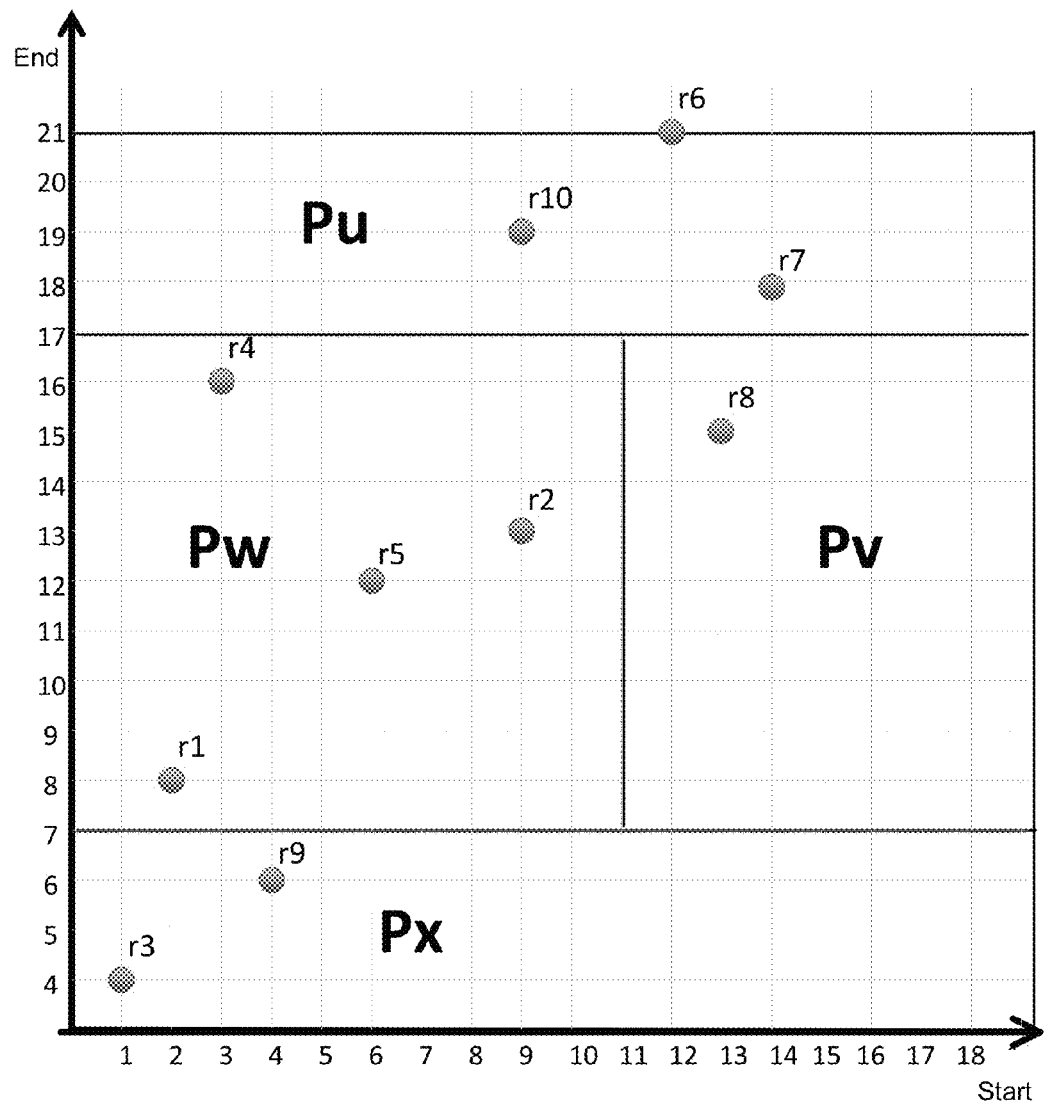
FIG. 10B illustrates a second tree-based parent partitioning scheme in accordance with one example implementation of the present invention.

FIG. 9 is a flow chart illustrating a crossover process 900 for application to tree-based partitioning schemes in accordance with a specific implementation of the present invention. Initially, two current partitioning schemes may be selected as parent partitioning schemes in operation 902. For example, two partitioning schemes, which result in the lowest cost or overhead, are selected from the fraction of current partitioning schemes. A first example tree-based parent partitioning scheme having partitions $P_a$, $P_b$, $P_c$, and $P_d$ is illustrated in FIG. 10A. A second example parent having partitions $P_u$, $P_v$, $P_w$, and $P_x$ is illustrated in FIG. 10B.

Figure 10C:
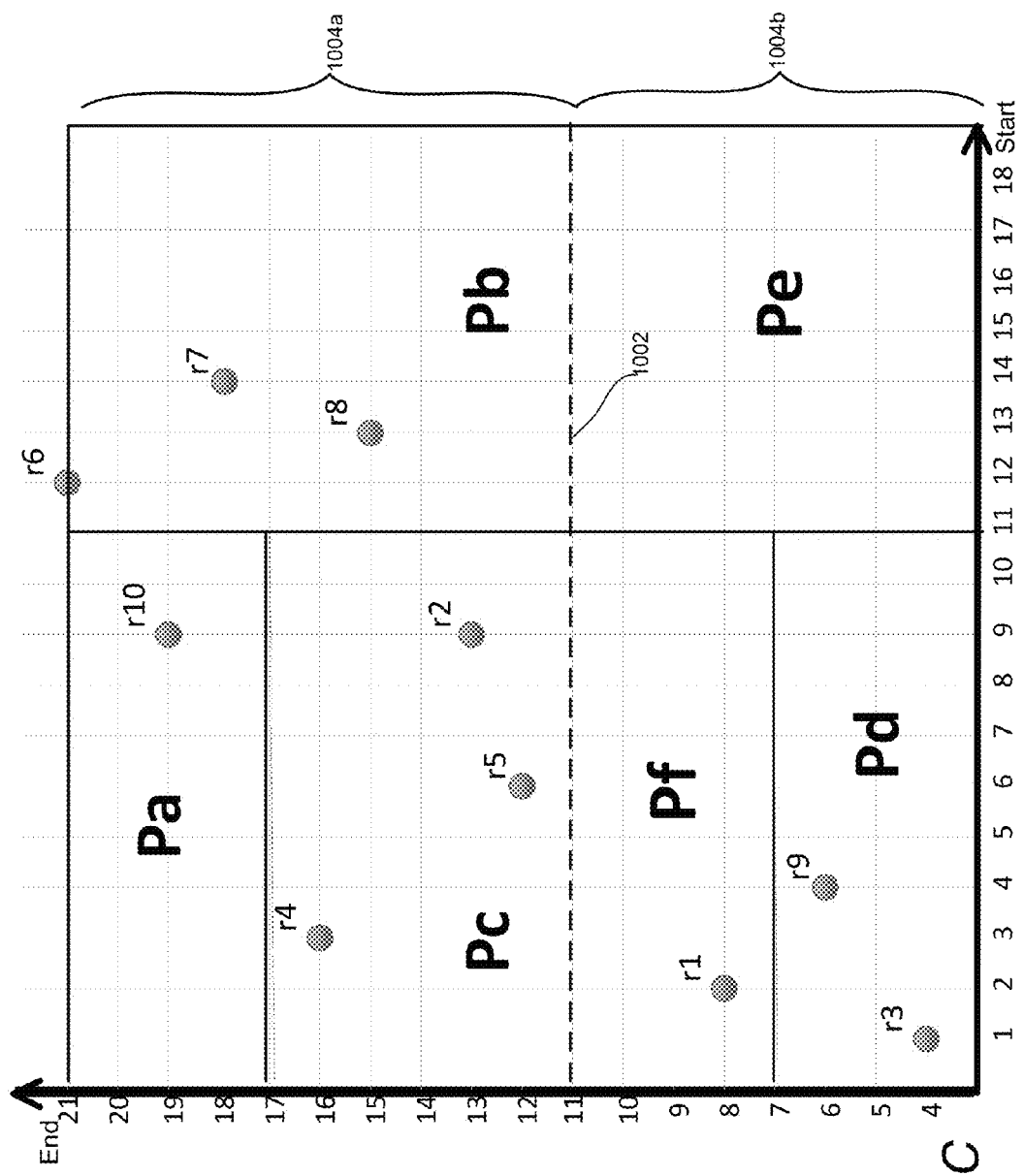
FIG. 10C illustrates creation of new partitions from a new horizontal line with respect to the first parent in accordance with one embodiment of the present invention.

A new vertical or horizontal partition position, which is between a first and last position of the 2D data record positions, may then be randomly selected in operation 904. For example, horizontal "end" time position 11 may be selected for placement of a horizontal line with respect to the illustrated parents of FIGS. 10A and 10B. The two input parents may then be split using this same randomly selected vertical or horizontal position to form a vertical or horizontal partition line in operation 906. FIG. 10C illustrates creation of new partitions $P_e$ and $P_f$ from new horizontal line 1002 at end time position 11 with respect to the first parent. Partition $P_c$ of the parent (FIG. 10A) is contracted so that data record r1 no longer belongs to child partition $P_c$ (FIG. 10C) and is now a part of the child partition $P_f$. Similarly, partition $P_b$ of the parent (FIG. 10A) is contracted into new child partition $P_b$, while new child partition $P_e$ is formed.

Figure 10D:
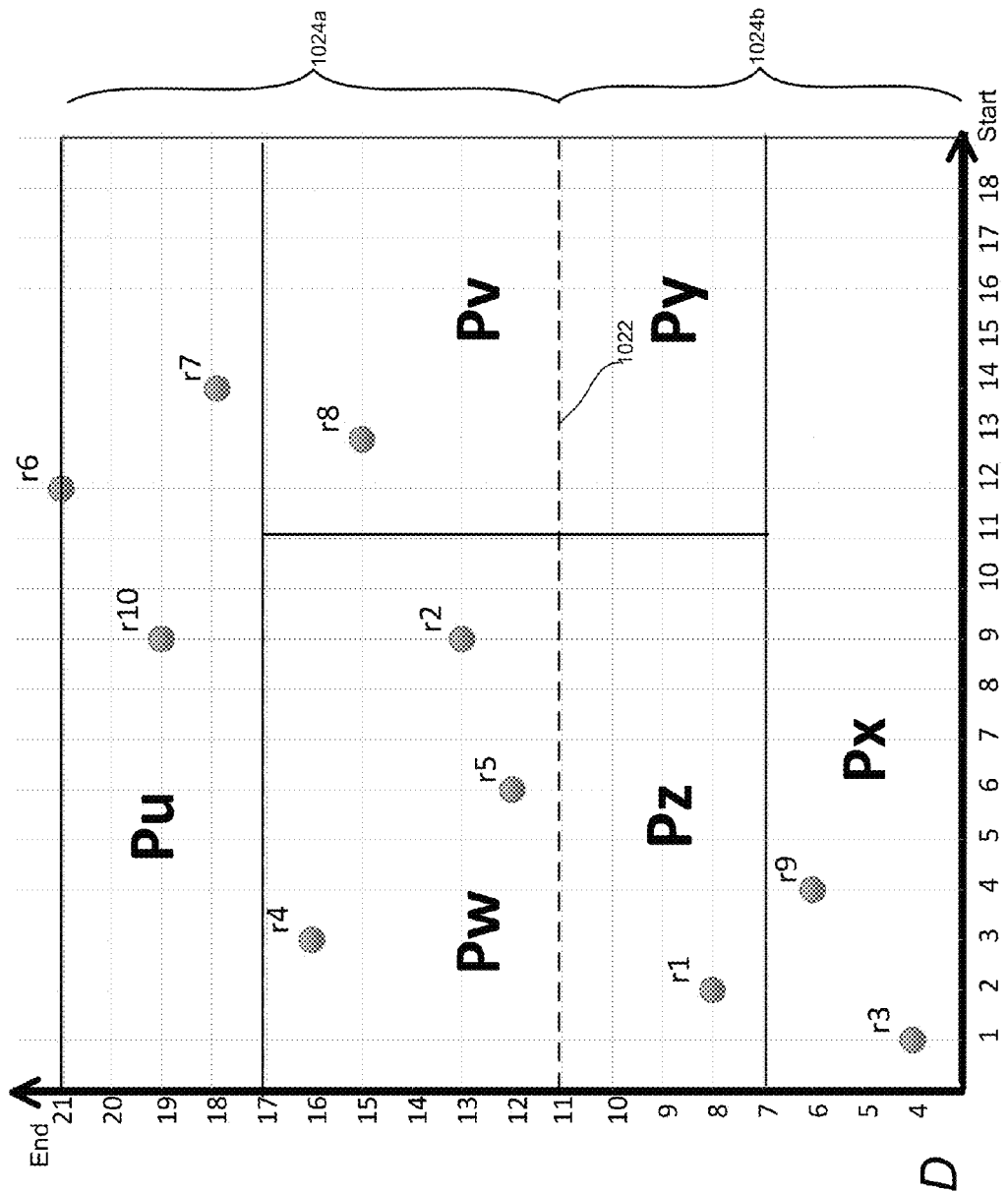
FIG. 10D illustrates formation of new partitions for a new horizontal line with respect to a second parent in accordance with one embodiment of the present invention.

FIG. 10D illustrates formation of new partitions $P_y$ and $P_z$ for the new horizontal line 1022 at the same end time position 11. In this child partitioning scheme, child partition $P_w$ is smaller than the parent partition $P_w$ (FIG. 10B) and no longer includes data record $r_1$, which is now contained in new child partition $P_z$. Similarly, parent partition $P_v$ (FIG. 10B) is contracted into smaller child parent $P_v$ (FIG. 10D) and new child partition $P_y$ is formed (FIG. 10D).

Each parent may then be trimmed into two or more partition groups and then individual partition groups from each parent may be mixed together to form two or more new children partitioning schemes in operation 908. If, for example, the selected split line was vertical, then the right part of the first parent will be trimmed, keeping only the left part to be covered by its tree. Conversely, the second parent's tree will only keep the right part, while the left part will be trimmed. Then, a new root node for each child's tree can be created by combining the kept top part for one parent with the trimmed part from the other parent so as to cover the entire 2D space.

Figure 10E:
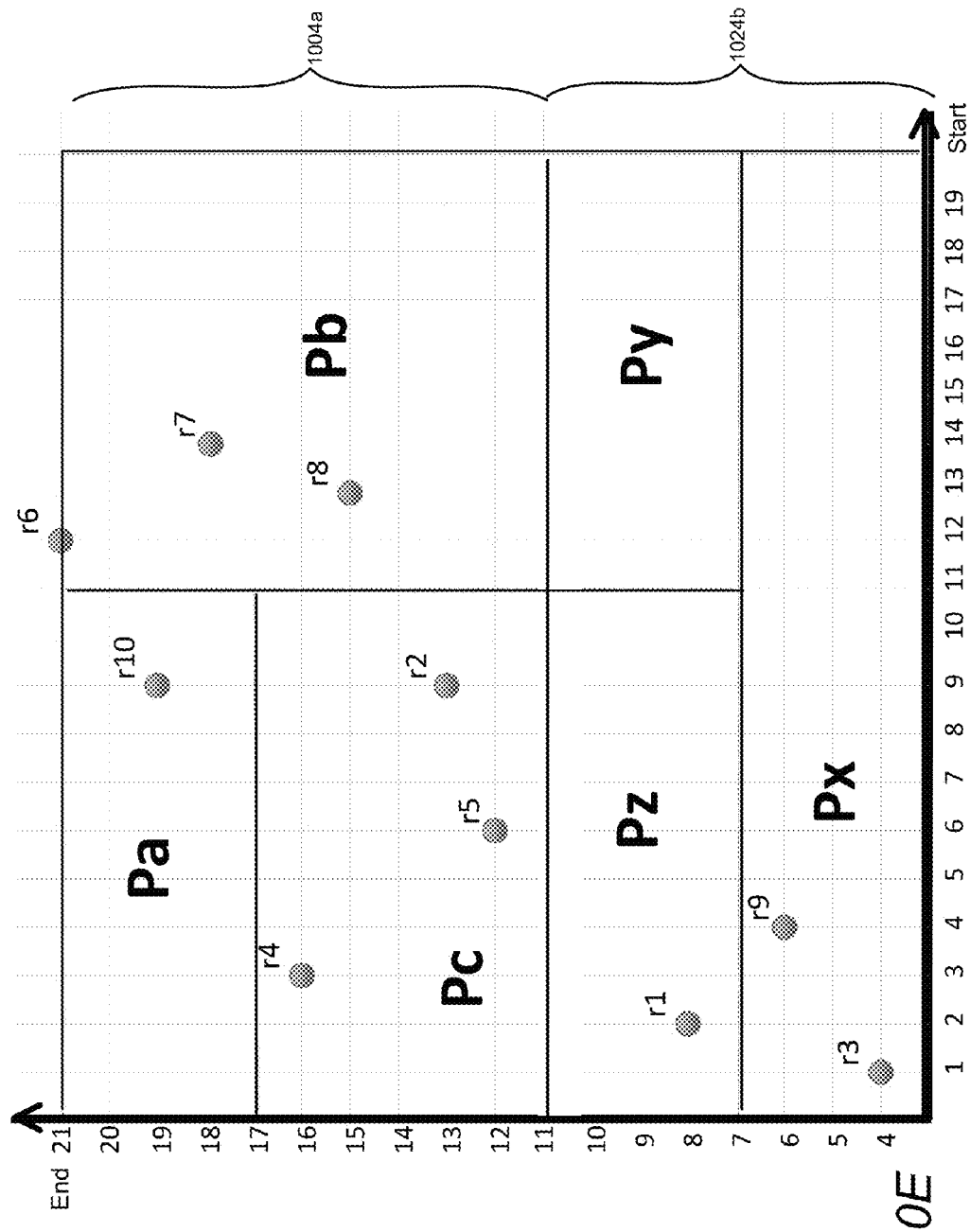
FIG. 10E illustrates a first child that is formed from a top portion of the first parent of FIG. 10C and the bottom portion of the second parent of FIG. 10D in accordance with one implementation of the present invention.
Figure 10F:
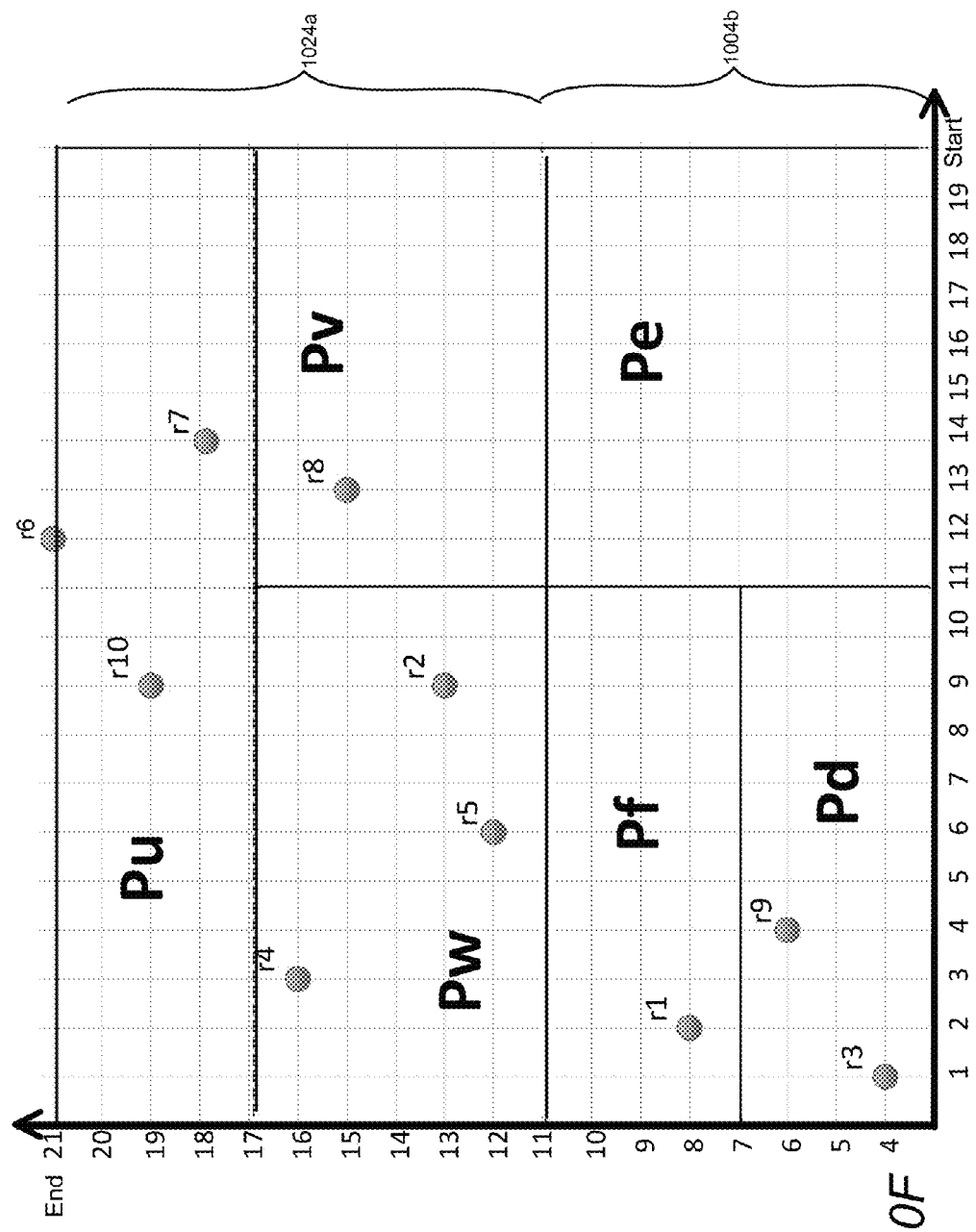
FIG. 10F illustrates a second child that is formed from a top portion of the second parent of FIG. 10D and the bottom portion of the first parent of FIG. 10C in accordance with one implementation of the present invention.

The illustrated example of FIGS. 10E and 10F illustrate two children partitioning schemes that result from splitting and combining different parent top and bottom portions with respect to a new horizontal line. FIG. 10E illustrates a first child that is formed from a top portion of the first parent of FIG. 10C and the bottom portion of the second parent of FIG. 10D in accordance with one implementation of the present invention. As shown, top portion 1004a from the parent of FIG. 10A is combined with bottom portion 1024b from the parent of FIG. 10B. A second child formed from the two parents is also shown in FIG. 10F. This second child has top portion 1024a from the parent of FIG. 10D and bottom portion 1004b from the parent of FIG. 10C.

Figure 10G:
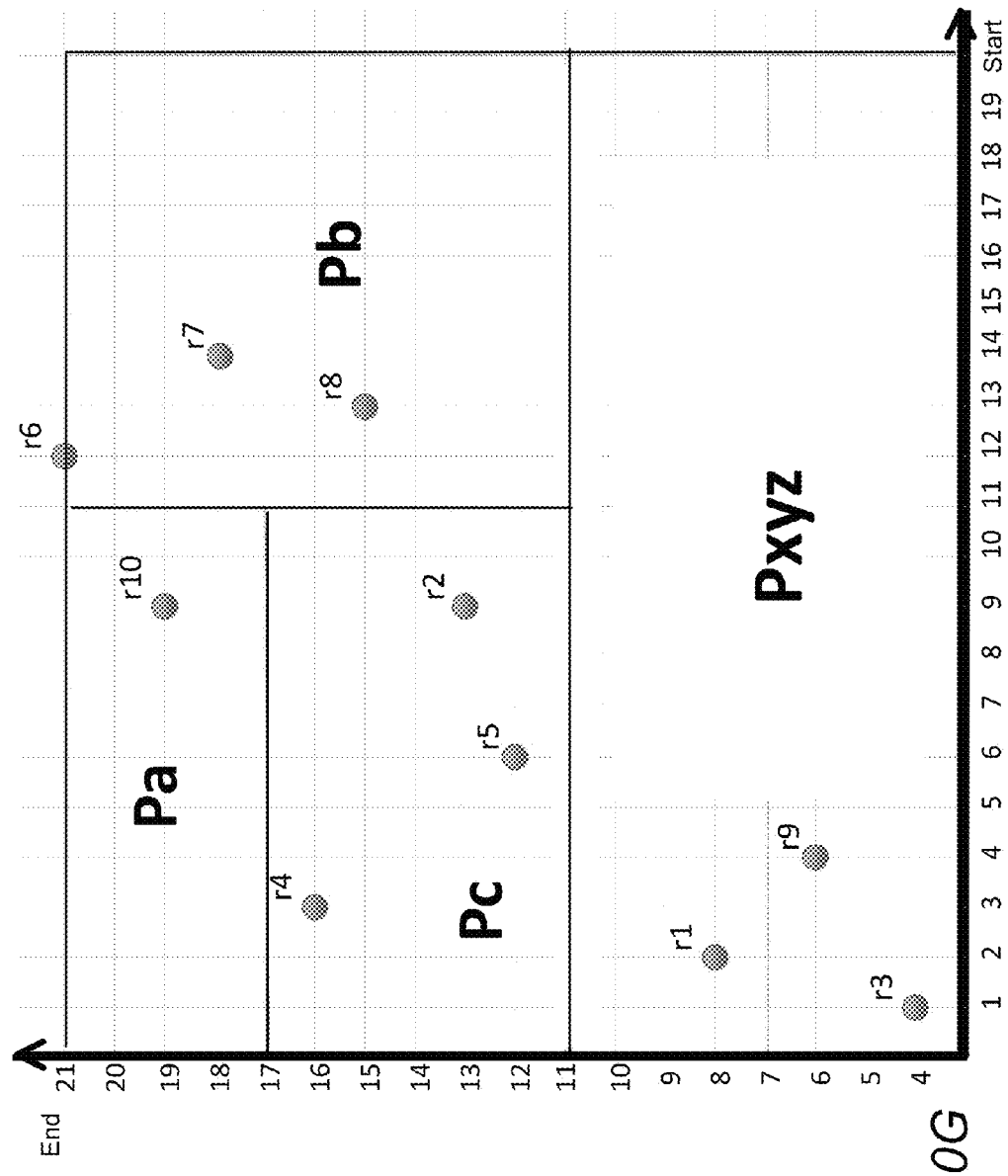
FIG. 10G illustrates the partitioning results from merging some of the partitions of the child partitioning scheme of FIG. 10E to form a new partition of another child partitioning scheme.
Figure 10H:
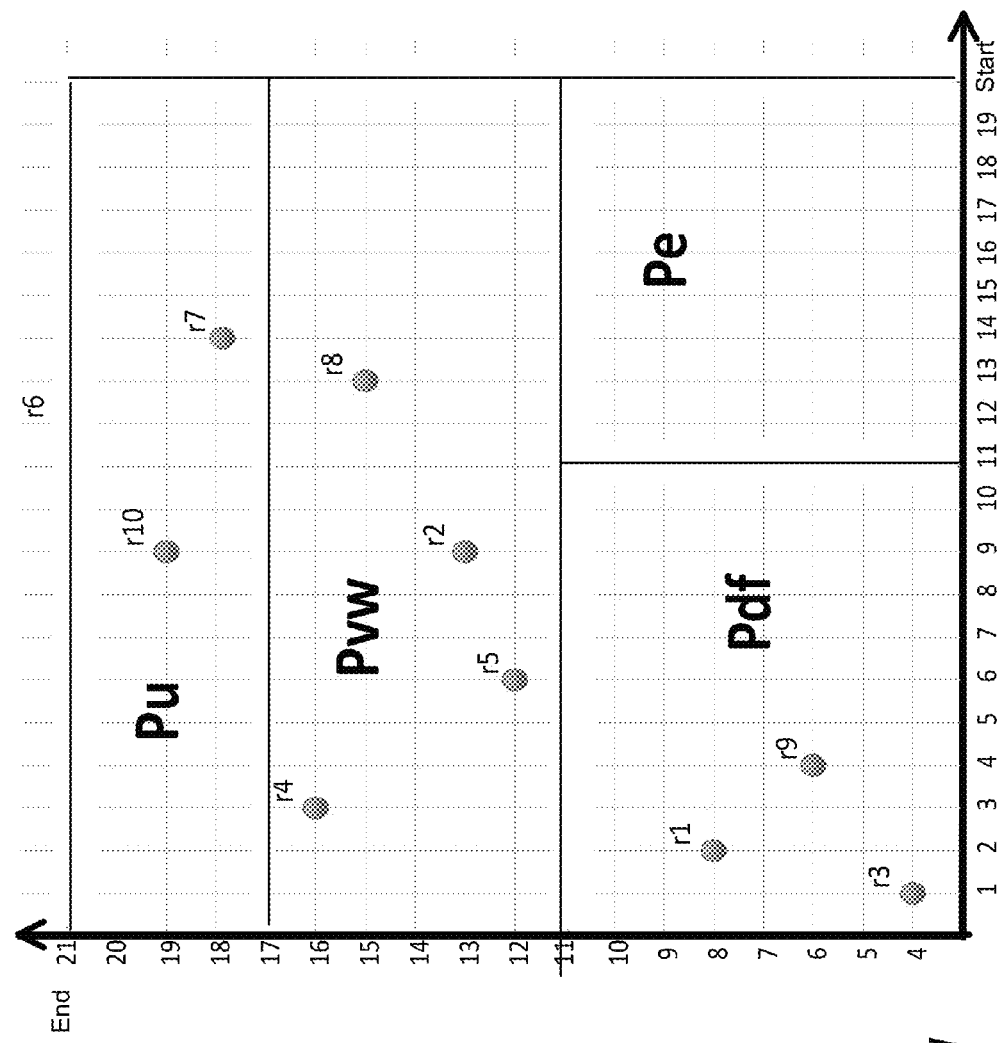
FIG. 10H illustrates the partitioning results from merging some of the partitions of the child partitioning scheme of FIG. 10F to form new partition of another child partitioning scheme.

At this point, the child's tree may contain more or less leaf nodes than the target partition count $K_t$. To correct this situation, existing leaf nodes can be either randomly split or randomly merged with their siblings until the total number of leaf nodes equals the target partition $K_t$ in operation 910. For instance, a mutation may be performed to remove a child partition or add a new child partition. FIG. 10G illustrates the partitioning results from merging the partitions $P_x$, $P_y$, and $P_z$ of FIG. 10E to form a new child partitioning scheme having new partition P. Likewise, FIG. 10H illustrates the partitioning results from merging partitions $P_v$ and $P_w$ of FIG. 10E to form a new child partitioning scheme having new partition $P_{vw}$. Alternatively, the children partitions may be further split or merged until a partition count is within a predefined range with respect to the target count.

The functions of trimming a tree given a split line and of merging a leaf node with its sibling are both more complex than the simple function of splitting a leaf node into more partitions/leaves. The trimming operations may operate recursively starting from the root. The root node is first trimmed using a horizontal or vertical split line. Then, if the split line goes through one of the child nodes, that child is properly trimmed too. If the child node was completely on the "to-keep" side of the split line, it remains unchanged. Otherwise, if such child node is on the "to-trim" side of the split line, then such child node can then be completely removed from the tree along with all of its descendants. For nodes that get partially trimmed, all their children can be examined and processed in the same way.

A leaf or partition merge operation may be recursive in the sense that a random leaf node to be merged may first be found and then its sibling can be identified. The identified sibling may then be pre-processed recursively as follows. Initially, the sibling node is expanded towards the neighboring to-be-merged node up until the border opposite to their shared border. Then, for each child of the sibling node, if the child shares a border with the to-be-merged node, then it is also expanded in the same direction until the opposite border of the to-be-merged node is reached. Otherwise, if the child does not share a border with the to-be-merged node, then it remains unchanged. By the end of processing, the sibling node and its descendants, the randomly selected leaf node, would have been completely merged with its neighbors and the total number of leaf nodes is decreased by one.

A mutation operation may also be performed on an input tree-based partitioning scheme. A leaf node in the tree may be randomly split to increase the leaf nodes by one, and another leaf node may be randomly merged with another leaf node to bring the total number back to $K_t$. For instance, a leaf node is selected and the records of such leaf are then distributed to another leaf partition. In the specific example of FIG. 3B, the records of the partition P2 may be split and moved into partitions P1, P3, and P4 so that new bigger partitions P1, P3, and P4 are formed. Another partition P4 is then formed by splitting one of the new larger partitions P1, P3, or P4.

A greedy algorithm may also be implemented to more efficiently generate a random tree-based partitioning scheme. The greedy algorithm may start by creating a root node covering the entire 2D space, and leaf nodes continue to be selected and split until the total number of leaf nodes is $K_t$. However, a greedy strategy, rather than a random strategy, may be used to select and split each next leaf node. In particular, for each leaf node and for each feasible split for that node, that would not violate the minimum partition size requirement, the leaf node split resulting in the maximum gain in terms of cost reduction may be selected.

Any suitable cost determination process may be implemented with any of the techniques for finding an optimum partitioning scheme that are described herein. According to Equation 1, the cost corresponding to a partition can be modeled as the number of queries that overlap with the partition multiplied by the number of records inside the partition. This cost model would perform well, e.g., result in partitions with good quality, if all the records have the same size (number of bytes). However, a more precise estimate of the cost corresponding to a partition would consider the size of each record in the cost formula. More formally, the cost of a certain partition, such as p, may be determined as follows:

$$\text{Cost}(p) = O_q(p) \times \Sigma_{\forall r \in p} \text{Size}(r), \quad \text{Equation [2]}$$

where $O_q(p)$ is the number of queries that overlap with p and $\text{Size}(r)$ is the size of record r.

A cost corresponding to each given partition may be calculated according to the above Equation 2. For instance, in the tree-based greedy algorithm, the best split for each leaf node that would achieve the maximum gain in terms of cost reduction may be determined. In a more specific embodiment, cost may be computed for all the possible horizontal and vertical splits and for each pair of emerging partitions. Thus, the computation of the cost of a certain partition is preferably extremely efficient because such computation can have a direct impact on the overall running time of all the partitioning algorithms.

A straightforward implementation of the cost computation process can be described as follows. Rectangles corresponding to the query workload can be inserted into an R-Tree, $R_w$, and also the points corresponding to all the (start, end) intervals can be inserted into another R-Tree, $R_i$, where the data size of each point is recorded for each point. To compute the cost corresponding to a certain partition, p, the total data size of the points in p can be determined by searching into $R_i$ with the bounds of p, and the number of queries that overlap with p by searching into $R_w$ with the bounds of p. The two numbers can then be multiplied together to get the cost of p.

The above approach for computing the cost of p embeds a lot of redundancy. Since one is assumed to be interested in aggregates, inserting and retrieving individual points or queries into the R-Trees is redundant. Furthermore, a static query workload and static point data may be assumed. Thus, the data and the workload may be processed in a way that enables quick look-up of the cost corresponding to a given partition.

Given a partition, p, the cost contains two components: 1) the total data size in p and 2) the number of queries overlapping with p. For the first component, instead of inserting the data points (e.g., (start, end) intervals into an R-Tree), they can be inserted into a two dimensional grid. If it is assumed that the search space is a grid of n rows and m columns, each grid cell, e.g., cell[i, j], will initially contain the total size of the points (records) whose interval equals (i, j).

Then, the data corresponding to each cell in the grid can be aggregated as follows. For every row, the cells can be scanned from column 0 to column m and the corresponding values can be aggregated during the scan, e.g., cell[i, j]=cell[i, j]+cell[i, j−1] ∀ j∈[2,m]. Afterwards, the same process can be repeated at the column-level, e.g., cell[i, j]=cell[i, j]+cell[i−1, j] ∀ i∈[2, n]. After this phase, the value of each cell, e.g., cell[i, j] will correspond to the total data size of all the points in the rectangle bounded by cell[0, 0] (bottom left) and cell[i, j] (top right). To compute the total data size corresponding to a given partition bounded by the cells cell[b, l] (bottom left) and cell[t, r] (top right), the values of only four cells can be added or subtracted e.g., perform an O(1) operation. More specifically, the total data size can be determined by:

$$\text{total}=\text{cell}[t,r]-\text{cell}[t,l-1]-\text{cell}[b-1,r]+\text{cell}[b-1,l-1] \quad \text{Equation [3]}$$

For the second component of the cost function, e.g., the number of queries that overlap with a partition, a similar approach as discussed above can be used. The queries can be inserted into a grid and the number of queries overlapping with each cell can be pre-aggregated. Over-counting a query more than once can be avoided because a query can overlap with multiple grid cells. Ultimately, the number of queries that overlap with a partition in O(1) can be found.

The above technique of grid-based pre-aggregation can significantly increase the efficiency of the above-described partitioning algorithm. Without pre-aggregation, e.g., using a straightforward R-Tree-based computation, the partitioning processes can be impractical (e.g., take hours or even days for high values of $K_t$). With the O(1) look-ups, these pre-aggregations can enable most of the partitioning algorithms to complete execution within one or two seconds.

Certain embodiments for finding partitioning schemes have several associated advantages over other partitioning techniques. As opposed to spatial indexing methods that effectively partition data into multiple buckets and are mainly concerned with the data distribution irrespective of the query workload, certain partitioning embodiments described herein take the workload into account. In particular, regions of data that are queried with high frequency can be more aggressively partitioned, compared to the other less popular regions. Such a fine-grained partitioning of the in-high-demand data can result in significant savings in query processing time.

Certain techniques of the present invention can also achieve partitioning without duplication of the data records. Some existing spatial indexing methods, particularly space-partitioning trees, can cause data records to be duplicated in multiple partitions if those records happen to cross partition boundaries.

Certain embodiments of the present invention also avoid splitting data across partitions. Additionally, certain partitioning schemes provide mechanisms for controlling the amount of skew in partition sizes so as to reduce tasks of the map-reduce job performing data partitioning, as each output partition will be handled by one of those reducers. Thus, certain embodiments can allow two configuration parameters, a min partition size and max partition size, which the user can set to control the lower and upper bounds of the partition sizes respectively. The number of output partitions can also be controlled by the parameter, $K_t$, representing the target number of partitions. Thus, the partition number can be bounded with respect to $K_t$ by: $K_t \leq K_a \leq 2 \times K_t$.

Figure 11:
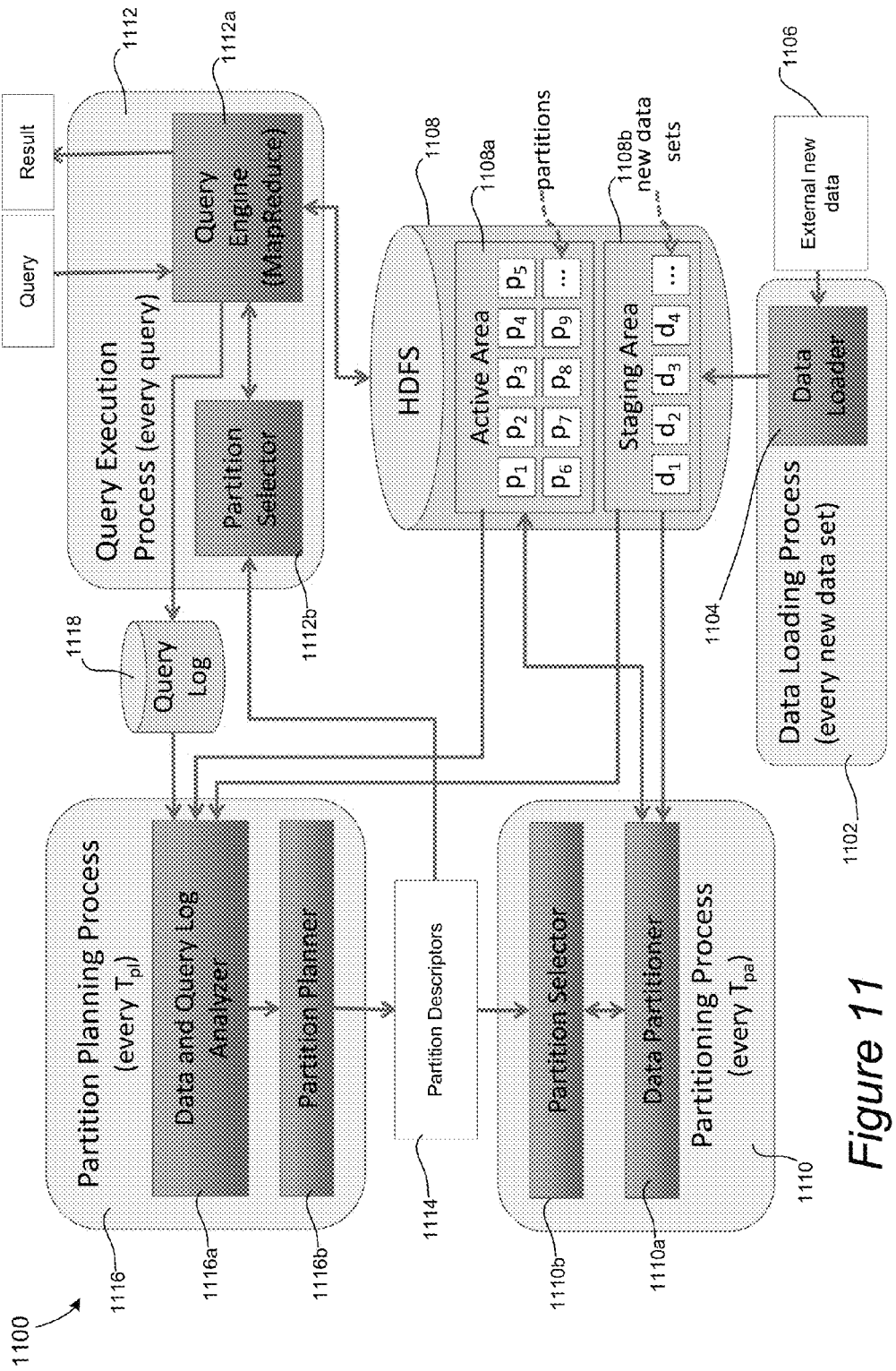
FIG. 11 illustrates an example of a system for executing techniques in accordance with one or more embodiments.

The techniques of the present invention may be implemented in any suitable combination of hardware and software. FIG. 11 is a diagrammatic representation of an example system 1100 in which techniques of the present invention may be implemented. The system generally includes data store 1108 maintained within HDFS, for example. The data store 1108 may have two main areas: a staging area 1108b, which only serves as a transient location for incoming new data sets, and an active area 1108a, into which the new data sets are ultimately loaded, partitioned, and made available to answer user queries.

The system may include any suitable number and type of components for implementing four main processes: a partition planning process 1116, a data partitioning process 1110, a query execution process 1112, and a data loading process 1102. Each process can run on its own schedule independently from the other processes. However, the processes do interact through their inputs and outputs.

The partition planning process 1116 is generally responsible for identifying an optimal (or near optimal) partitioning scheme (e.g., according to the cost model in Equation 1 or 2) to be later used for partitioning the data and serving the query load. This partition planning process 1116 may include a data and query log analyzer component 1116a, which aggregates and maps the active and new data records residing in HDFS, along with the historical queries from the query log 1118, onto the 2D space. The data and queries in their new format may then be passed to the second component, the partition planner 1116b to run one or more partitioning algorithms that are operable to find an optimum partitioning scheme, for example, to minimize the useless data scanning of queries. The output partitioning scheme may then be written to a disk (typically on HDFS) to be available for other processes.

This planning process 1116 can run every given time, $T_{pl}$. Depending on the anticipated rate of change in the workload patterns, $T_{pl}$ can be configured to have different values; e.g, weekly, monthly, etc. The planning process 1116 can also be dynamically triggered by a continuous monitoring system that detects workload pattern changes.

The data partitioning process 1110 may run at a higher frequency (every $T_{pa}$) than the partition planning process 1116. For instance, the partitioning process 1110 may execute daily. The data partitioning process 1110 is generally responsible for using the partitioning scheme derived by the planning process 1116 to actually construct the new partitions out of both the active (previously-partitioned) and the newly arriving (never partitioned) data.

In the illustrated embodiment, the data partitioning process 1110 includes two components. The first component is the partition selector 1110b, which first loads the most recent partition descriptors from disk to memory, and then given an input data record, finds the matching partition descriptor. This selector component 1110b can be used by the second component, the data partitioner 1110a, to properly assign each scanned data record to its new partition.

The data partitioner 1110a can be implemented as a map-reduce job, where the mappers read different chunks of records and then send each record to the appropriate reducer, which will ultimately write the corresponding partition file to HDFS, for example. Data partitioning can be treated as an atomic transaction in the sense that all output partition files are first written to a temporary directory, and then only when partitioning is complete, the old active directory is deleted and the temporary directory is renamed to replace it. If any failures occur during partitioning, the temporary directory is deleted and the process can be repeated.

The query execution process 1112 can be continuously running as long as queries are being served by the system. This query execution process 1112 can also have two components, including a partition selector 1112b, which can also be an instance of the partition selector 1110b of the partitioning process 1110. The partition selector 1112b can have a slightly different role in this context, where partition selector 1112b is given a query as input and, in return, provides all the partitions overlapping with the query range. The second component, which is the query engine 1112a, can use the partition selector 1112b to decide which partitions need to be scanned to answer a given query. In addition to answering incoming queries, the query engine 1112a can also log all those queries (1118), so that they can be later used by the partition planning process 1116.

The data loading process 1102 can be triggered by the arrival of a new data set. The data loading process 1102 can include a data loader 1104 that can ingest this new data, perform any necessary sanity checking and transformations, and finally load the new data set into the staging area 1108b in data store 1108. This new data set can then wait in the staging area 1108b until the next run of the data partitioning process 1110, which will result in partitioning the new data set's records and moving them to the active area 1108a to be ready for query answering.

Figure 12:
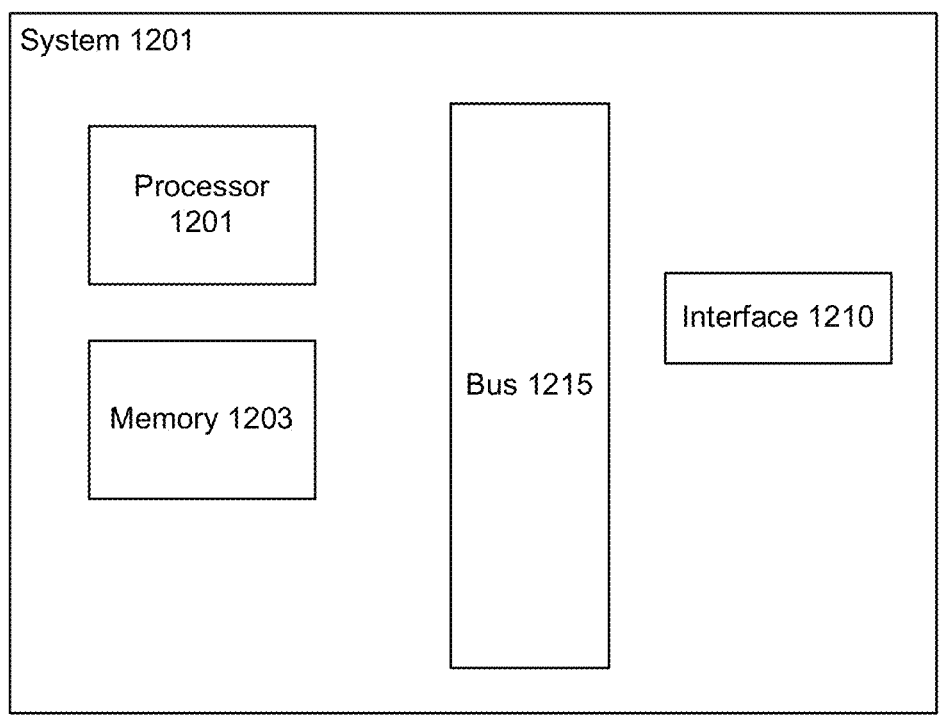
FIG. 12 illustrates an example of a server, configured in accordance with one or more embodiments.

FIG. 12 illustrates one example of a server. According to particular embodiments, a system 1200 suitable for implementing particular embodiments of the present invention includes a processor 1201, a memory 1203, an interface 1211, and a bus 1215 (e.g., a PCI bus or other interconnection fabric) and operates as a map/reducer node, calling service, zookeeper, or any other device or service described herein. Various specially configured devices can also be used in place of a processor 1201 or in addition to processor 1201. The interface 1211 is typically configured to send and receive data packets over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. Although a particular server is described, it should be recognized that a variety of alternative configurations are possible.

Because such information and program instructions may be employed to implement the systems/methods described herein, the present invention relates to machine readable storage media that include program instructions, state information, etc. for performing various operations described herein. Examples of machine-readable storage media include, but are not limited to, magnetic media such as hard disks, floppy disks, and magnetic tape; optical media such as CD-ROM disks; magneto-optical media such as floptical disks; and hardware devices that are specially configured to store and perform program instructions, such as ROM and RAM. Examples of program instructions include both machine code, such as produced by a compiler, and files containing higher level code that may be executed by the computer using an interpreter.

Although the foregoing invention has been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method for partitioning a set of data records having a plurality of ranges to which a plurality of queries for specific ranges can be applied, the method comprising:
    at least one or more processors, transforming a plurality of current data records, which each has a start time and an end time, into a two dimensional (2D) space having a first dimension upon which each data record's start time is mapped and a second dimension upon which each data record's end time is mapped;
    at the at least one or more processors, obtaining a plurality of historical queries that each specifies a data range, a response being previously sent for each historical query and specifying a sub-portion of the current data records that overlap with such historical query's specified data range;
    at the at least one or more processors, generating a plurality of partitioning schemes for the current data records in the 2D space;
    at the at least one or more processors, selecting an optimum one of the partitioning schemes based on a cost of executing the historical queries with respect to each of the partitioning schemes, wherein the optimum partitioning scheme has a lowest cost of the partitioning schemes; and
    at the at least one or more processors, applying the optimum partitioning scheme on the current data records, including newly received data records, in the 2D space so that any subsequently received queries are applied against the current data records as partitioned by the optimum partitioning scheme in the 2D space.

2. The method of claim 1, further comprising repeating the operations for generating a plurality of partitioning schemes and selecting an optimum one of the partitioning schemes every predefined time period.

3. The method of claim 1, further comprising repeating the operations for generating a plurality of partitioning schemes and selecting an optimum one of the partitioning schemes in response to a change in a query workload arising above a predefined amount.

4. The method of claim 1, wherein the generated partitioning schemes have or are filtered to have a partition count that is within a predefined range of count values.

5. The method of claim 1, wherein generating the partitioning schemes includes generating sequential generations of partitioning schemes so that each generation, except a first one of the generations, is based on altering a previous generation.

6. The method of claim 5, wherein generating the partitioning schemes is performed by:
    randomly generating the first generation of partitioning schemes;
    determining a cost of each partitioning scheme of the first generation;
    generating a next generation of partitioning schemes by altering a fittest fraction of the first generation, wherein the fittest fraction includes a sub-portion of the first generation's partitioning schemes having a lowest cost; and
    repeating the operation for generating a next generation of partitioning schemes by altering a fittest fraction of a previous next generation until it is determined to stop searching for the optimum partitioning scheme.

7. The method of claim 6, wherein it is determined to stop searching for the optimum partitioning schemes when a lowest cost one of each most recently generated two or more sequential next generations remains the same more than a predefined time period.

8. The method of claim 5, wherein altering the fittest fraction includes performing one or more combinations of cross-over or mutation operations.

9. The method of claim 5, wherein the generations of partitioning schemes include grid-based partitioning schemes.

10. The method of claim 5, wherein the generations of partitioning schemes include tree-based partitioning schemes.

11. The method of claim 10, wherein the tree-based partitioning schemes are generated based on a greedy algorithm.

12. The method of claim 5, wherein the generations of partitioning schemes include grid-based partitioning schemes and tree-based partitioning schemes.

13. A system for partitioning a set of data records having a plurality of ranges to which a plurality of queries for specific ranges can be applied, the system comprising at least one or more processors and a memory, wherein the at least one or more processors and memory are configured to perform the following operations:
  transforming a plurality of current data records, which each has a start time and an end time, into a two dimensional (2D) space having a first dimension upon which each data record's start time is mapped and a second dimension upon which each data record's end time is mapped;
  obtaining a plurality of historical queries that each specifies a data range, a response being previously sent for each historical query and specifying a sub-portion of the current data records that overlap with such historical query's specified data range;
  at the at least one or more processors, generating a plurality of partitioning schemes for the current data records in the 2D space;
  selecting an optimum one of the partitioning schemes based on a cost of executing the historical queries with respect to each of the partitioning schemes, wherein the optimum partitioning scheme has a lowest cost of the partitioning schemes; and
  applying the optimum partitioning scheme on the current data records, including newly received data records, in the 2D space so that any subsequently received queries are applied against the current data records as partitioned by the optimum partitioning scheme in the 2D space.

14. The system of claim 13, wherein the processor and/or memory are further configured for repeating the operations for generating a plurality of partitioning schemes and selecting an optimum one of the partitioning schemes every predefined time period.

15. The system of claim 13, wherein the processor and/or memory are further configured for repeating the operations for generating a plurality of partitioning schemes and selecting an optimum one of the partitioning schemes in response to a change in a query workload arising above a predefined amount.

16. The system of claim 13, wherein the generated partitioning schemes have or are filtered to have a partition count that is within a predefined range of count values.

17. The system of claim 13, wherein generating the partitioning schemes includes generating sequential generations of partitioning schemes so that each generation, except a first one of the generations, is based on altering a previous generation.

18. The system of claim 17, wherein generating the partitioning schemes is performed by:
  randomly generating the first generation of partitioning schemes;
  determining a cost of each partitioning scheme of the first generation;
  generating a next generation of partitioning schemes by altering a fittest fraction of the first generation, wherein the fittest fraction includes a sub-portion of the first generation's partitioning schemes having a lowest cost; and
  repeating the operation for generating a next generation of partitioning schemes by altering a fittest fraction of a previous next generation until it is determined to stop searching for the optimum partitioning scheme.

19. The system of claim 18, wherein it is determined to stop searching for the optimum partitioning schemes when a lowest cost one of each most recently generated two or more sequential next generations remains the same more than a predefined time period.

20. The system of claim 17, wherein altering the fittest fraction includes performing one or more combinations of cross-over or mutation operations.

21. The system of claim 17, wherein the generations of partitioning schemes include grid-based partitioning schemes.

22. The system of claim 17, wherein the generations of partitioning schemes include tree-based partitioning schemes.

23. The system of claim 22, wherein the tree-based partitioning schemes are generated based on a greedy algorithm.

24. The system of claim 17, wherein the generations of partitioning schemes include grid-based partitioning schemes and tree-based partitioning schemes.

25. At least one non-transitory computer readable storage medium having computer program instructions stored thereon that are arranged to perform the following operations:
  at least one or more processors, transforming a plurality of current data records, which each has a start time and an end time, into a two dimensional (2D) space having a first dimension upon which each data record's start time is mapped and a second dimension upon which each data record's end time is mapped;
  at the at least one or more processors, obtaining a plurality of historical queries that each specifies a data range, a response being previously sent for each historical query and specifying a sub-portion of the current data records that overlap with such historical query's specified data range;
  at the at least one or more processors, generating a plurality of partitioning schemes for the current data records in the 2D space;
  at the at least one or more processors, selecting an optimum one of the partitioning schemes based on a cost of executing the historical queries with respect to each of the partitioning schemes, wherein the optimum partitioning scheme has a lowest cost of the partitioning schemes; and
  at the at least one or more processors, applying the optimum partitioning scheme on the current data records, including newly received data records, in the 2D space so that any subsequently received queries are applied against the current data records as partitioned by the optimum partitioning scheme in the 2D space.

* * * * *